(12) United States Patent
Yamazaki

(10) Patent No.: US 9,541,803 B2
(45) Date of Patent: Jan. 10, 2017

(54) LIQUID CRYSTAL DISPLAY DEVICE COMPRISING FIRST AND SECOND REFLECTIVE PIXEL ELECTRODES THAT OVERLAP EACH OTHER WITH AN INSULATING LAYER HAVING A TAPERED FIRST END PORTION INTERPOSED THEREBETWEEN

(71) Applicant: SEMICONDUCTOR ENERGY LABORATORY CO., LTD., Atsugi-shi, Kanagawa-ken (JP)

(72) Inventor: Shunpei Yamazaki, Tokyo (JP)

(73) Assignee: Semiconductor Energy Laboratory Co., LTD., Kanagawa-ken (JP)

( * ) Notice: Subject to any disclaimer, the term of this patent is extended or adjusted under 35 U.S.C. 154(b) by 0 days.

(21) Appl. No.: 14/729,097

(22) Filed: Jun. 3, 2015

(65) Prior Publication Data

US 2015/0261047 A1    Sep. 17, 2015

Related U.S. Application Data

(63) Continuation of application No. 13/015,183, filed on Jan. 27, 2011, now Pat. No. 9,057,918.

(30) Foreign Application Priority Data

Feb. 5, 2010   (JP) .................................. 2010-024643

(51) Int. Cl.
*G02F 1/1362* (2006.01)
*G02F 1/1333* (2006.01)
(Continued)

(52) U.S. Cl.
CPC ....... *G02F 1/134309* (2013.01); *G02F 1/1368* (2013.01); *G02F 1/13439* (2013.01); *G02F 1/133345* (2013.01); *G02F 1/136227* (2013.01)

(58) Field of Classification Search
CPC .................................................. G02F 2201/123
(Continued)

(56) References Cited

U.S. PATENT DOCUMENTS 5,673,127 A    9/1997 Takahara et al.
5,725,915 A    3/1998 Ishitaka et al.
(Continued)

FOREIGN PATENT DOCUMENTS

EP    1770788 A    4/2007
EP    1995787 A    11/2008
(Continued)

OTHER PUBLICATIONS

International Search Report (Application No. PCT/JP2011/050906) Dated Mar. 8, 2011.
(Continued)

*Primary Examiner* — Paul Lee
(74) *Attorney, Agent, or Firm* — Nixon Peabody LLP; Jeffrey L. Costellia

(57) ABSTRACT

In a reflective liquid crystal display device, a space where a pixel electrode is not provided between adjacent pixels causes a decrease in proportion of a display region in a pixel (i.e., aperture ratio). As a result, the reflective liquid crystal display device has a problem in that contrast and luminance of display images are decreased. An object is to provide a liquid crystal display device which displays an image with high contrast and high luminance. In the liquid crystal display device, an end portion of a pixel electrode is provided to overlap with an end portion of an adjacent pixel electrode with an insulating layer interposed therebetween
(Continued)

so that a space between adjacent pixels is narrowed; thus, the proportion of a display region in a pixel is increased.

14 Claims, 21 Drawing Sheets

(51) Int. Cl.
*G02F 1/1368* (2006.01)
*G02F 1/1343* (2006.01)

(58) Field of Classification Search
USPC ............................................. 349/48, 114, 139
See application file for complete search history.

(56) References Cited

U.S. PATENT DOCUMENTS

| | | | |
|---|---|---|---|
| 5,875,008 A | 2/1999 | Takahara et al. | |
| 5,936,685 A | 8/1999 | Ito et al. | |
| 6,037,197 A | 3/2000 | Yamazaki et al. | |
| 6,049,364 A | 4/2000 | Takahara et al. | |
| 6,218,679 B1 | 4/2001 | Takahara et al. | |
| 6,226,057 B1 | 5/2001 | Lee | |
| 6,233,033 B1* | 5/2001 | Moore | G02F 1/134336 349/139 |
| 6,384,886 B2 | 5/2002 | Yamazaki et al. | |
| 6,404,472 B1 | 6/2002 | Andreatta et al. | |
| 6,426,787 B1 | 7/2002 | Satake et al. | |
| 6,493,052 B1 | 12/2002 | Satake et al. | |
| 6,545,653 B1 | 4/2003 | Takahara et al. | |
| 6,819,378 B2 | 11/2004 | Yamazaki et al. | |
| 6,839,108 B1* | 1/2005 | Hirakata | G02F 1/133553 349/114 |
| 7,674,650 B2 | 3/2010 | Akimoto et al. | |
| 7,732,819 B2 | 6/2010 | Akimoto et al. | |
| 7,821,613 B2 | 10/2010 | Kimura | |
| 7,910,490 B2 | 3/2011 | Akimoto et al. | |
| 7,932,521 B2 | 4/2011 | Akimoto et al. | |
| 8,274,077 B2 | 9/2012 | Akimoto et al. | |
| 8,466,463 B2 | 6/2013 | Akimoto et al. | |
| 8,629,069 B2 | 1/2014 | Akimoto et al. | |
| 8,669,550 B2 | 3/2014 | Akimoto et al. | |
| 8,790,959 B2 | 7/2014 | Akimoto et al. | |
| 8,796,069 B2 | 8/2014 | Akimoto et al. | |
| 2002/0163614 A1* | 11/2002 | Hinata | G02F 1/1339 349/139 |
| 2007/0013823 A1 | 1/2007 | Jung et al. | |
| 2007/0065603 A1 | 3/2007 | Leu et al. | |
| 2008/0068527 A1* | 3/2008 | Um | G02F 1/13624 349/48 |
| 2008/0308805 A1 | 12/2008 | Akimoto et al. | |
| 2009/0059152 A1 | 3/2009 | Kamada et al. | |
| 2009/0072232 A1 | 3/2009 | Hayashi et al. | |
| 2009/0305461 A1 | 12/2009 | Akimoto et al. | |
| 2011/0104851 A1 | 5/2011 | Akimoto et al. | |
| 2011/0121290 A1 | 5/2011 | Akimoto et al. | |

FOREIGN PATENT DOCUMENTS

| | | |
|---|---|---|
| EP | 1998373 A | 12/2008 |
| EP | 1998374 A | 12/2008 |
| EP | 1998375 A | 12/2008 |
| JP | 02-017721A U | 9/1990 |
| JP | 04-264528 A | 9/1992 |
| JP | 05-216071 A | 8/1993 |
| JP | 06-160875 A | 6/1994 |
| JP | 07-152033 A | 6/1995 |
| JP | 08-297301 A | 11/1996 |
| JP | 10-123564 A | 5/1998 |
| JP | 10-170954 A | 6/1998 |
| JP | 11-044893 A | 2/1999 |
| JP | 2000-002875 A | 1/2000 |
| JP | 2004-029386 A | 1/2004 |
| JP | 2005-062589 A | 3/2005 |
| JP | 2007-123861 A | 5/2007 |
| JP | 2007-250982 A | 9/2007 |
| JP | 2009-063696 A | 3/2009 |
| JP | 2009-063698 A | 3/2009 |
| JP | 2009-069422 A | 4/2009 |
| JP | 2009-134041 A | 6/2009 |
| WO | WO-2007/108293 | 9/2007 |

OTHER PUBLICATIONS

Written Opinion (Application No. PCT/JP2011/050906) Dated Mar. 8, 2011.

\* cited by examiner

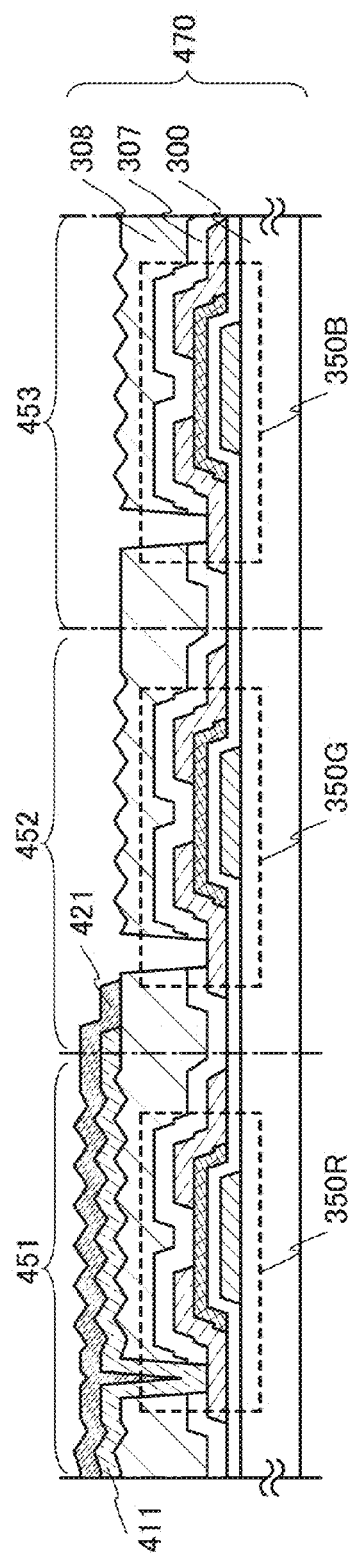
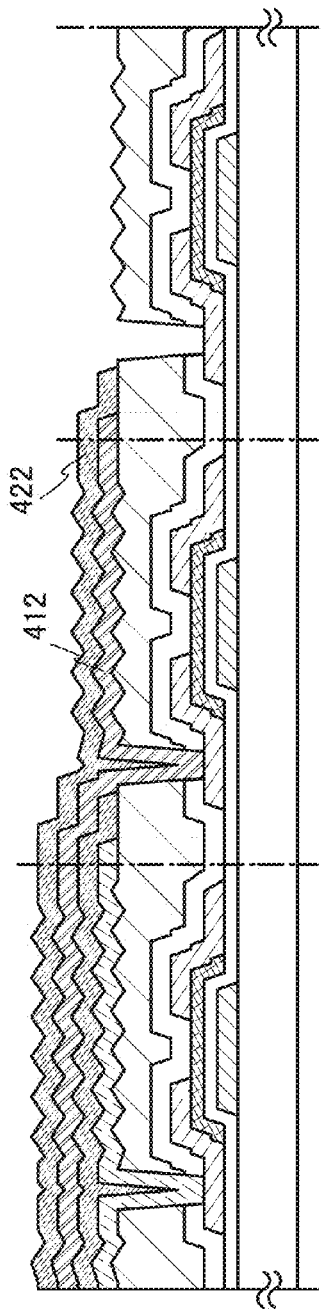
FIG. 6A
FIG. 6B

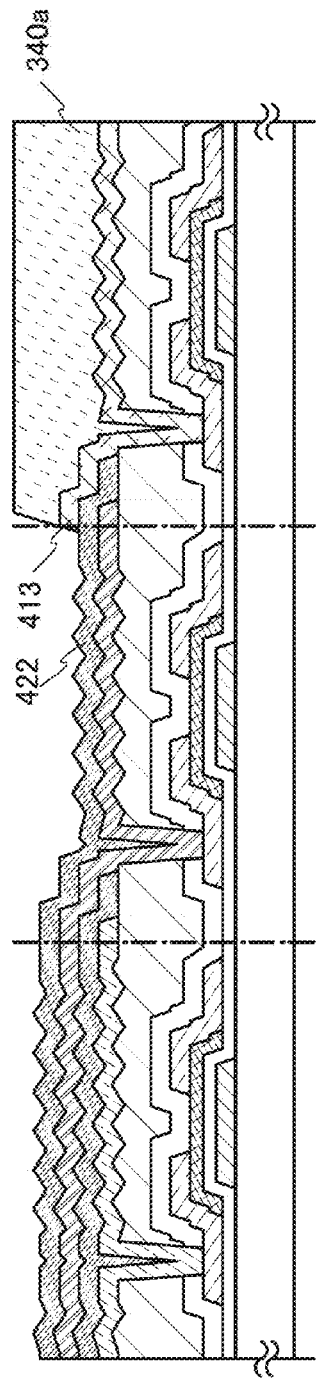
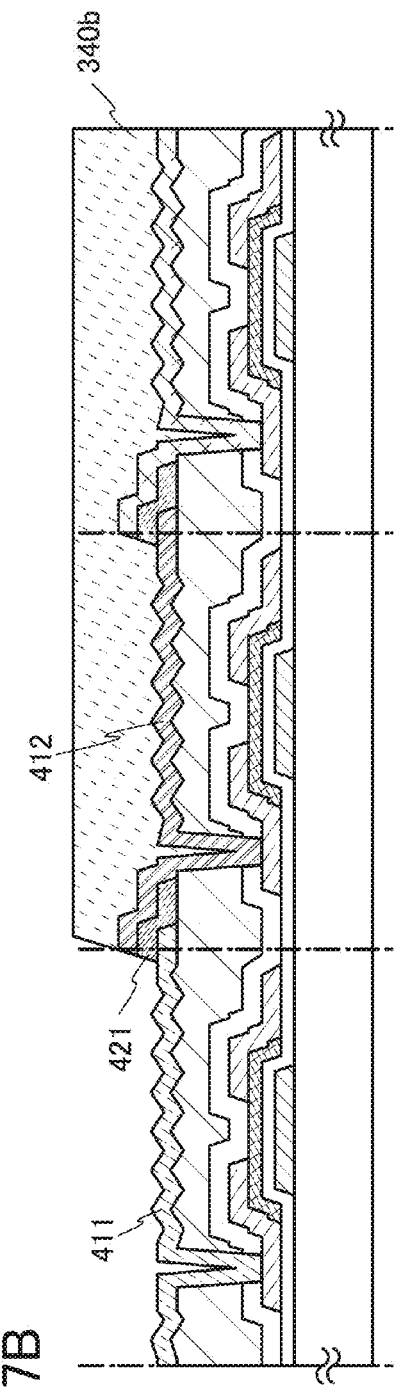
FIG. 7A
FIG. 7B

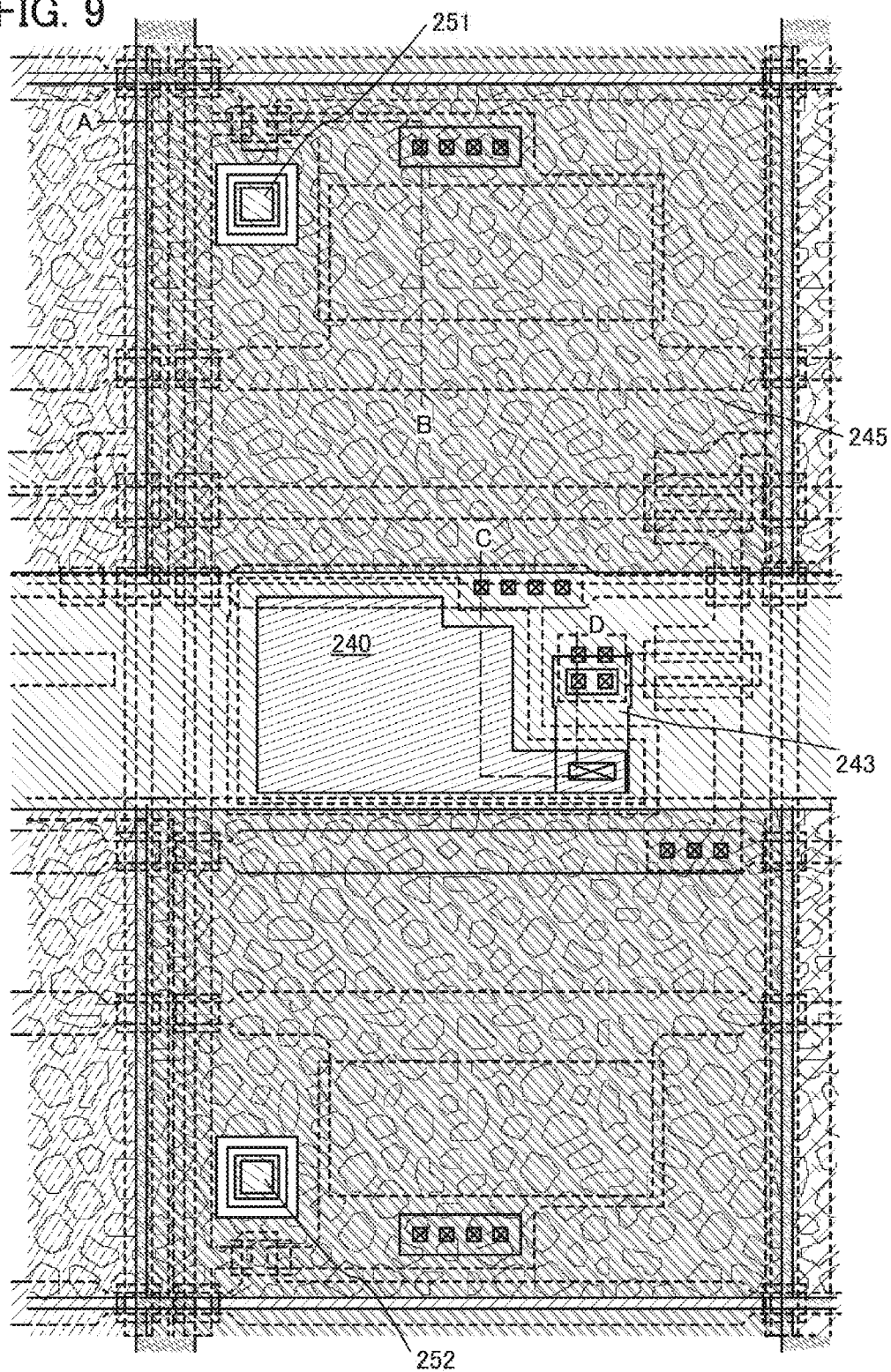

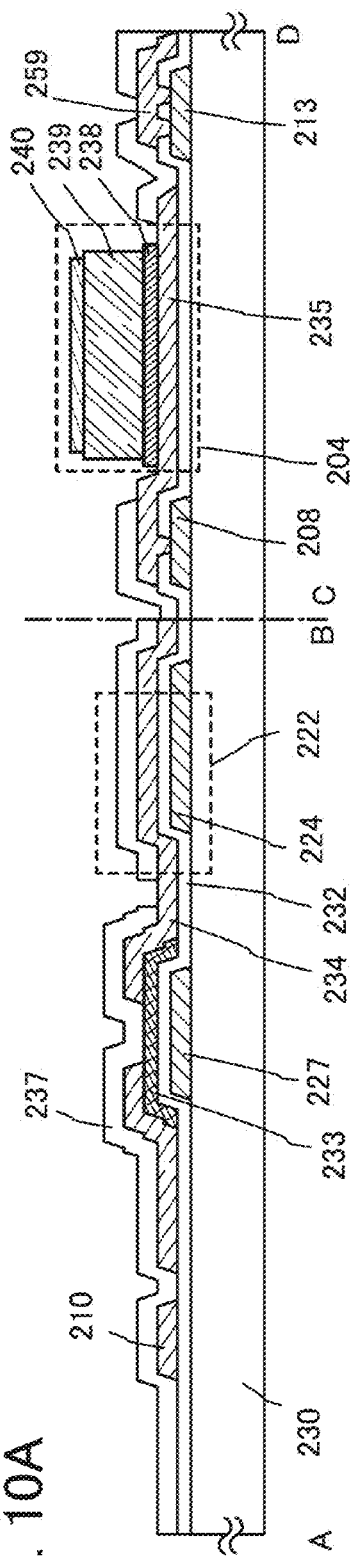
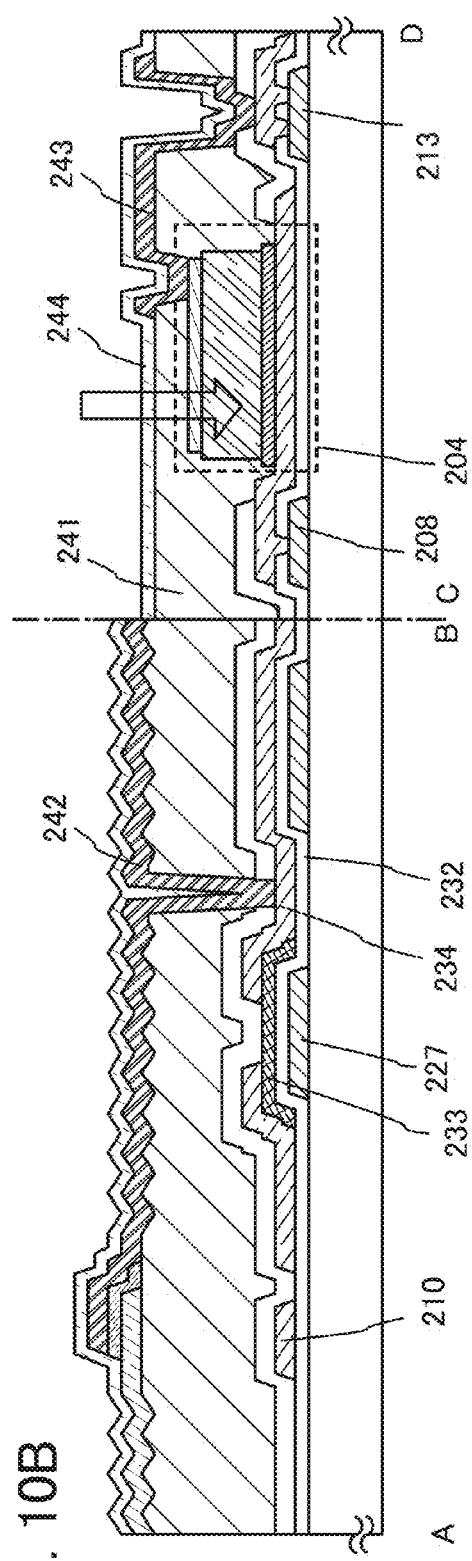

LIQUID CRYSTAL DISPLAY DEVICE COMPRISING FIRST AND SECOND REFLECTIVE PIXEL ELECTRODES THAT OVERLAP EACH OTHER WITH AN INSULATING LAYER HAVING A TAPERED FIRST END PORTION INTERPOSED THEREBETWEEN

TECHNICAL FIELD

The present invention relates to a reflective display device, particularly relates to a liquid crystal display device provided with a plurality of pixel electrodes that reflect external light.

BACKGROUND ART

With the development of the information society, portable information devices such as phones, computers, and digital cameras have been widely used. There are limitations on weight and volume of a portable information device so that the information device is carried. In particular, the proportion of weight and volume of a battery is high in an information device; thus, the capacity of the battery is limited.

In order to provide a portable information device having a battery with limited capacity that can be used for a long time, it is necessary to use components and devices with less power consumption for the portable information devices. As an example of the display device with less power consumption, a reflective liquid crystal display device is given.

Since in a refractive liquid crystal display device, a backlight is not used and external light is utilized for display, the power consumption of the liquid crystal display device is low. As an example of the reflective liquid crystal display device, a display device in which a reflective electrode is provided with a texture structure formed including a material with a low refractive index and a light-reflecting film formed including a material with a high refractive index is formed thereover has been invented (see Patent Document 1).

REFERENCE

[Patent Document 1] Japanese Published Patent Application No. 2000-2875

DISCLOSURE OF INVENTION

In a reflective liquid crystal display device, images are displayed using external light; thus, a space where a pixel electrode is not provided between adjacent pixels causes a decrease in proportion of a display region in a pixel (i.e., aperture ratio). As a result, the reflective liquid crystal display device has a problem in that contrast and luminance of display images are decreased.

The present invention is made in view of the foregoing technical background. Therefore, an object of one embodiment of the present invention is to provide a liquid crystal display device which displays an image with high contrast and high luminance.

In order to achieve the above object, the following may be performed: in a liquid crystal display device, an end portion of a pixel electrode is provided to overlap with an end portion of an adjacent pixel electrode with an insulating layer interposed therebetween so that a space between adjacent pixels is narrowed; thus, the proportion of a display region in a pixel is increased.

That is, one embodiment of the present invention is a liquid crystal display device including an insulating layer; a first pixel electrode and a second pixel electrode each electrically connected to a switching element; a counter electrode facing the first pixel electrode and the second pixel electrode; and a liquid crystal layer between the first and second pixel electrodes and the counter electrode. Further, in the liquid crystal display device, an end portion of the second pixel electrode overlies an end portion of the first pixel electrode with the insulating layer interposed therebetween.

Another embodiment of the present invention is the above liquid crystal display device in which the insulating layer extends from the end portion of the second pixel electrode, overlies a top surface of the first pixel electrode, and is colored.

Another embodiment of the present invention is the above liquid crystal display device in which the insulating layer covers a side surface of the second pixel electrode overlying the top surface of the first pixel electrode.

Another embodiment of the present invention is the above liquid crystal display device in which a transistor including an oxide semiconductor is used as the switching element.

Another embodiment of the present invention is a liquid crystal display device including a first insulating layer; a second insulating layer; a first pixel electrode, a second pixel electrode, and a third pixel electrode each electrically connected to a switching element; a counter electrode facing the first pixel electrode, the second pixel electrode, and the third pixel electrode; and a liquid crystal layer between the first, second, and third pixel electrodes and the counter electrode. Further, in the liquid crystal display device, a transistor including an oxide semiconductor is used as the switching element; the first, second, and third pixel electrodes adjoin one another with the second pixel electrode interposed between the first pixel electrode and the third pixel electrode; one end portion of the second pixel electrode overlies an end portion of the first pixel electrode with the first insulating layer interposed therebetween; and the other end portion of the second pixel electrode underlies an end portion of the third pixel electrode with the second insulating layer interposed therebetween.

Another embodiment of the present invention is a liquid crystal display device including a first insulating layer; a second insulating layer; a first pixel electrode, a second pixel electrode, and a third pixel electrode each electrically connected to a switching element; a counter electrode facing the first pixel electrode, the second pixel electrode, and the third pixel electrode; and a liquid crystal layer between the first, second, and third pixel electrodes and the counter electrode. Further, in the liquid crystal display device, a transistor including an oxide semiconductor is used as the switching element; the first, second, and third pixel electrodes adjoin one another with the second pixel electrode interposed between the first pixel electrode and the third pixel electrode; one end portion of the second pixel electrode overlies an end portion of the first pixel electrode with the first insulating layer interposed therebetween; and the other end portion of the second pixel electrode overlies an end portion of the third pixel electrode with the second insulating layer interposed therebetween.

Another embodiment of the present invention is a liquid crystal display device including a first insulating layer; a second insulating layer; a first pixel electrode, a second pixel electrode, and a third pixel electrode each electrically connected to a switching element; a counter electrode facing the first pixel electrode, the second pixel electrode, and the third pixel electrode; and a liquid crystal layer between the first, second, and third pixel electrodes and the counter electrode. Further, in the liquid crystal display device, a transistor including an oxide semiconductor is used as the switching element; the first, second, and third pixel electrodes adjoin one another with the second pixel electrode interposed between the first pixel electrode and the third pixel electrode; one end portion of the second pixel electrode underlies an end portion of the first pixel electrode with the first insulating layer interposed therebetween; and the other end portion of the second pixel electrode underlies an end portion of the third pixel electrode with the second insulating layer interposed therebetween.

Another embodiment of the present invention is the above liquid crystal display device including the pixel electrode and a photo sensor electrically connected to the transistor including an oxide semiconductor over one substrate; and a black matrix between the pixel electrode and the photo sensor.

Note that in this specification, an off-state current is a current which flows between a source electrode and a drain electrode when a transistor is off. For example, in the case of an n-channel transistor, the off-state current refers to a current which flows between a source electrode and a drain electrode when the gate voltage is lower than the threshold voltage of the transistor.

According to the present invention, a liquid crystal display device displaying an image with high contrast and high luminance can be provided.

BRIEF DESCRIPTION OF DRAWINGS

In the accompanying drawings:

FIGS. 6A and 6B are cross-sectional views illustrating a process for manufacturing a pixel portion according to the embodiment;

FIGS. 7A and 7B are cross-sectional views illustrating a process for manufacturing a pixel portion according to the embodiment;

FIG. 9 is a top view illustrating a pixel portion according to the embodiment;

FIGS. 10A and 10B are cross-sectional views illustrating a pixel portion according to the embodiment;

BEST MODE FOR CARRYING OUT THE INVENTION

Figure 1A:
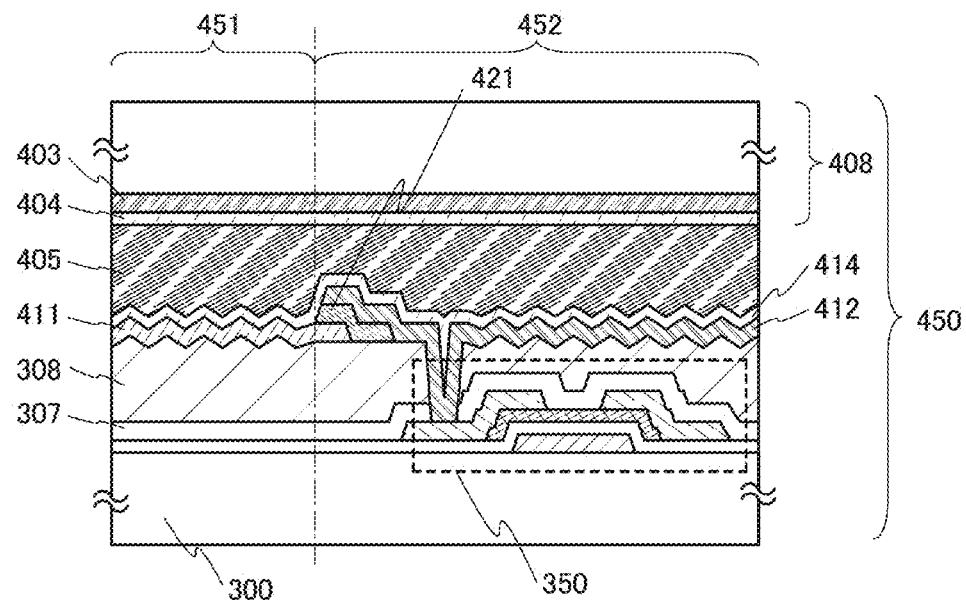
FIGS. 1A and 1B are cross-sectional views each illustrating a pixel portion according to an embodiment.

Embodiments will be described with reference to the drawings. Note that the present invention is not limited to the following description, and it will be easily understood by those skilled in the art that modes and details thereof can be changed in various ways without departing from the spirit and the scope of the present invention. Therefore, the invention should not be interpreted as being limited to the description in the following embodiments. Note that in the structures of the invention described below, the same portions or portions having similar functions are denoted by the same reference numerals in different drawings, and description of such portions is not repeated.

Embodiment 1

In this embodiment, a structure of a liquid crystal display device in which an end portion of a pixel electrode overlaps with an end portion of an adjacent pixel electrode with an insulating layer interposed therebetween will be described with reference to FIGS. 1A and 1B. Further, a manufacturing method thereof will be described with reference to FIGS. 2A to 2C.

Structures of two adjacent pixel electrodes of a liquid crystal display device described in this embodiment will be described with reference to cross-sectional views. FIG. 1A illustrates a liquid crystal display device 450 where a first pixel 451 and a second pixel 452 adjoin to each other.

The liquid crystal display device 450 includes a plurality of pixels such as the first pixel 451 and the second pixel 452. The first pixel 451 includes a first pixel electrode 411. The second pixel 452 includes a second pixel electrode 412. Note that the first pixel electrode 411 and the second pixel electrode 412 are formed over an insulating layer 308 provided over a substrate 300. An alignment film 414 is formed over the first pixel electrode 411 and the second pixel electrode 412. A counter electrode 403 is provided on a surface of a counter substrate 408, and an alignment film 404 is provided on the counter electrode 403. A liquid crystal layer 405 is in contact with the alignment films 414 and 404, and interposed between the substrate 300 and the counter substrate 408.

The irregularities of a surface of the insulating layer 308 in FIG. 1A schematically illustrates an uneven structure in an irregular state called a texture structure. Since the first pixel electrode 411 and the second pixel electrode 412 are formed over the insulating layer 308 having a texture structure, the texture structure appears on surfaces of the first pixel electrode 411 and the second pixel electrode 412. As a result, light incident on the pixel electrodes irregularly reflects, and the first pixel electrode 411 and the second pixel electrode 412 are macroscopically white in general. Note that when alignment of liquid crystal is controlled using a pixel electrode that is seen white, contrast can be increased.

The first pixel electrode 411 is electrically connected to a source electrode or a drain electrode of a transistor that is not shown. The second pixel electrode 412 is electrically connected to a source electrode or a drain electrode of the transistor 350. Note that the transistor 350 functions as a switching element of the pixel 452. A pixel transistor including the transistor 350 is formed over the substrate 300, and the first pixel electrode 411 and the second pixel electrode 412 are formed over an insulating layer 307 and the insulating layer 308 which cover the pixel transistor.

An end portion of the second pixel electrode 412 is provided to overlap with an end portion of the first pixel electrode 411 with an insulating layer 421 interposed therebetween. The insulating layer 421 prevents electrical connection between the first pixel electrode 411 and the second pixel electrode 412.

With a structure in which two adjacent pixel electrodes are provided so as to overlap with each other, a space between the two pixel electrodes is not seen when the display device is viewed from the front. As a result, the ratio of an area of a pixel electrode in each pixel can be increased. A display device including pixel electrodes with such a structure can display an image with high luminance and high contrast.

The structure of pixel electrodes of a liquid crystal display device 460, which differs from the structure illustrated in FIG. 1A, will be described. FIG. 1B illustrates a liquid crystal display device 460 where a first pixel 461 and a second pixel 462 adjoin to each other.

The first pixel 461 and the second pixel 462 are formed over the substrate 300. The first pixel 461 includes the first pixel electrode 411, and the second pixel 462 includes the second pixel electrode 412. The end portion of the second pixel electrode 412 is provided to overlap with the end portion of the first pixel electrode 411 with an insulating layer 421 interposed therebetween. The insulating layer 421 prevents electrical connection between the first pixel electrode 411 and the second pixel electrode 412.

A side surface of the second pixel electrode 412 in the liquid crystal display device 460 is covered with an insulating layer 431 provided over the first pixel electrode 411. Note that as the insulating layer 431, a layer functioning as a black matrix, for example, a coloring layer containing a coloring material, is preferably used. The liquid crystal display device 460 has the same structure as the liquid crystal display device 450 except that the insulating layer 431 is provided.

When a high electric field is generated between the first pixel electrode 411 and the side surface of the second pixel electrode 412, the alignment of liquid crystal located in such a region is disordered in some cases. The insulating layer 431 covering the side surface of the second pixel electrode 412 in the liquid crystal display device 460 reduces the electric field generated between the first pixel electrode 411 and the side surface of the second pixel electrode 412. As a result, the alignment of liquid crystal is hardly disordered, leading to improvement in quality of a display image. Further, a layer functioning as a black matrix is used as the insulating layer 431, the optical density of a dark region (i.e., a shadow portion) in a display image can be increased, so that the gradation of the shadow portion can be displayed more clearly.

Figure 17:
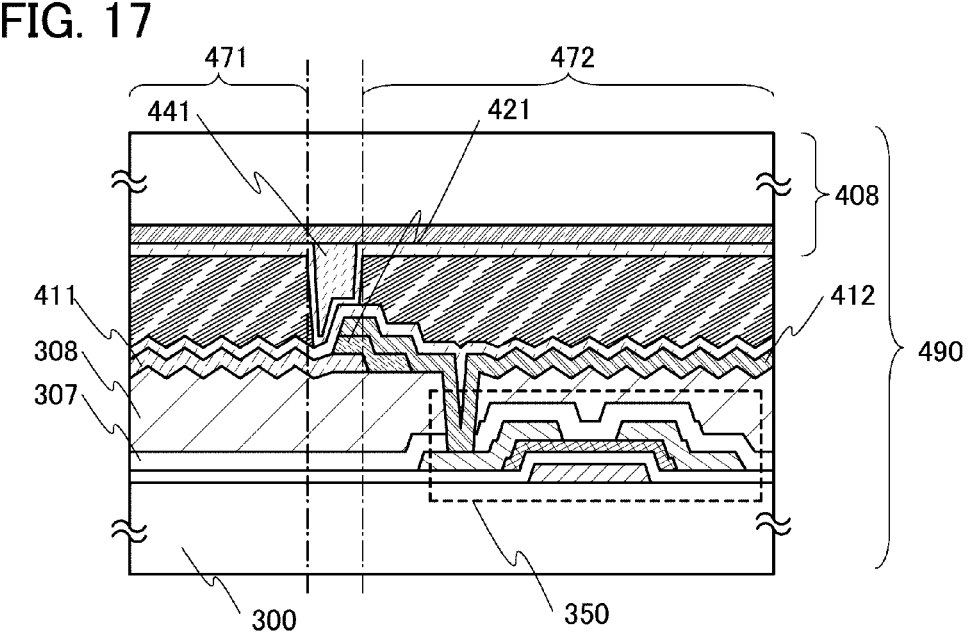
FIG. 17 is a cross-sectional view illustrating a pixel portion according to the embodiment.

The structure of pixel electrodes of a liquid crystal display device 490, which differs from the structures illustrated in FIGS. 1A and 1B, will be described. FIG. 17 illustrates a liquid crystal display device 490 where a first pixel 471 and a second pixel 472 adjoin to each other.

The first pixel 471 and the second pixel 472 are formed over the substrate 300. The first pixel 471 includes the first pixel electrode 411, and the second pixel 472 includes the second pixel electrode 412. The end portion of the second pixel electrode 412 is provided to overlap with the end portion of the first pixel electrode 411 with an insulating layer 421 interposed therebetween. The insulating layer 421 prevents electrical connection between the first pixel electrode 411 and the second pixel electrode 412.

A spacer 441 is provided in a region where the first pixel electrode 411 and the second pixel electrode 412 in the liquid crystal display device 490 overlap with each other. The spacer 441 is provided between the counter substrate 408 and the substrate 300, using a dielectric material, for example. Specifically, the spacer 441 can be formed on the counter substrate 408, using an organic resin. Alternatively, the spacer 441 can be formed using a layer functioning as a black matrix, for example, a coloring layer containing a coloring material. The liquid crystal display device 490 has the same structure as the liquid crystal display device 450 except that the spacer 441 is provided.

As described above, when a high electric field is generated between the first pixel electrode 411 and the side surface of the second pixel electrode 412, the alignment of liquid crystal located in such a region is disordered in some cases. In the liquid crystal display device 490, the spacer 441 is provided in such a region; thus, the alignment of liquid crystal can be prevented from being disordered.

Figure 1B:
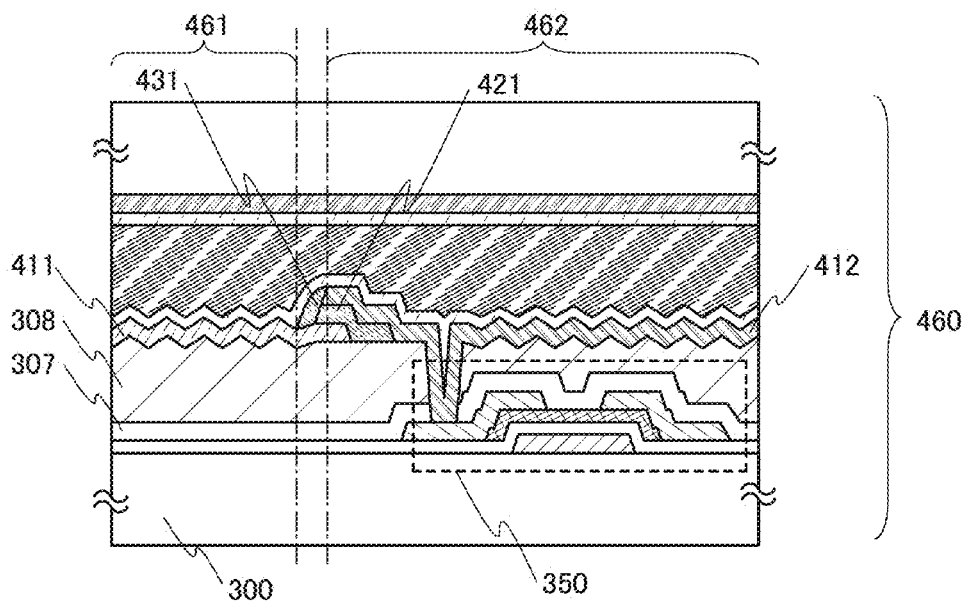
Figure 2A:
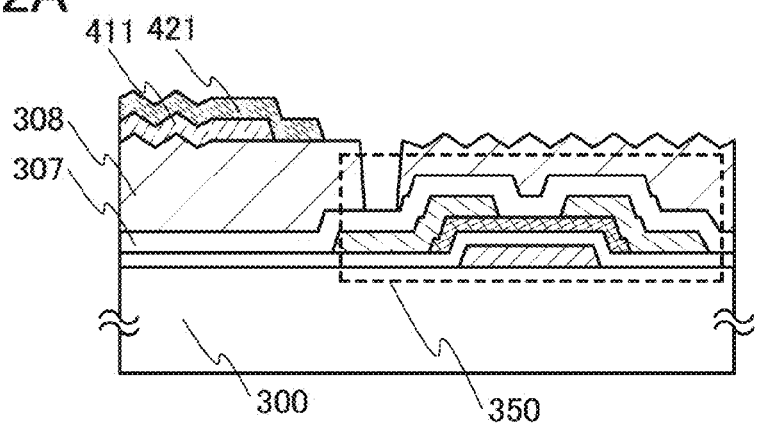
FIGS. 2A to 2C are cross-sectional views illustrating a process for manufacturing a pixel portion according to the embodiment.
Figure 2B:
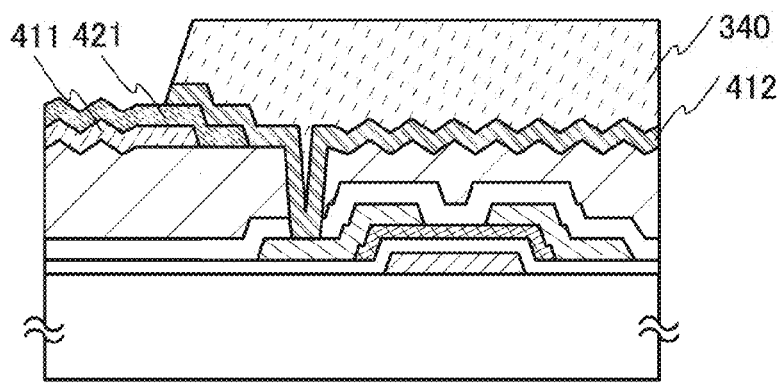
Figure 2C:
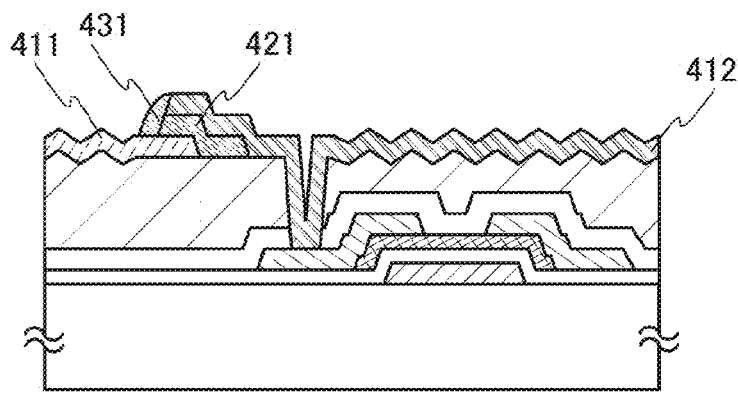

Next, a method for manufacturing the pixel electrode of one embodiment of the present invention, which is illustrated in FIG. 1B, over a substrate provided with a switching element will be described with reference to FIGS. 2A to 2C.

There is no particular limitation on the switching element formed over the substrate 300. As the switching element, a top gate transistor or a bottom gate transistor can be employed, for example. Further, the transistor may have a single gate structure including one channel formation region, a double gate structure including two channel formation regions, or a triple gate structure including three channel formation regions. Alternatively, the transistor may have a dual gate structure including two gate electrode layers positioned over and below a channel region with a gate insulating layer provided therebetween. As an example, FIGS. 2A to 2C illustrate the case where the transistor 350 with a bottom gate structure is employed. Note that a transistor including an oxide semiconductor layer in which off-state current is reduced is especially suitable as the switching element. When the transistor including an oxide semiconductor layer in which off-state current is reduced is used as a pixel transistor, for example, frequency of rewrites of display elements is reduced in a period during which a still image is displayed; thus, a display device with less power consumption can be provided.

The insulating layer 307 is formed over the transistor 350. As the insulating layer 370, typically, an inorganic insulating film such as a silicon oxide film, a silicon oxynitride film, an aluminum oxide film, and an aluminum oxynitride film can be used. Alternatively, the insulating layer 307 may be formed by stacking a plurality of insulating films. For example, an inorganic insulating film such as a silicon nitride film, an aluminum nitride film, a silicon nitride oxide film, or an aluminum nitride oxide film can be stacked over the above-mentioned inorganic insulating film. Note that the inorganic insulating film is formed by a sputtering method or the like.

The insulating layer 308 is formed over the insulating layer 307. For the insulating layer 308, a photosensitive organic resin can be used, for example. A photosensitive organic resin layer is formed over the insulating layer 307 by a spin coating method or the like, and exposed to light using a photomask in order to form an opening that reaches the source electrode or the drain electrode of the transistor 350. Then, light exposure is performed using another photomask in order to form a texture structure on the surface of the insulating layer 308 and developed, thereby forming the insulating layer 308.

Next, the first pixel electrode 411 is formed over the insulating layer 308. Any conductive film can be used for the first pixel electrode 411 as long as it reflects visible light. As an example of the conductive film, a film including Al, Ag, an alloy thereof, aluminum containing Nd, or an Ag—Pd—Cu alloy is given. Note that the conductive film can be formed by a sputtering method, a vacuum evaporation method, or the like. Then, an unnecessary portion is removed with use of a resist mask formed using a photomask, thereby forming the first pixel electrode 411.

Next, an insulating film to be the insulating layer 421 is provided so as to cover the first pixel electrode 411. Any material can be used for the insulating layer 421 as long as it has an insulating property. For example, an inorganic material such as silicon oxide, silicon oxynitride, aluminum oxide, aluminum oxynitride, silicon nitride, aluminum nitride, silicon nitride oxide, or aluminum nitride oxide; or an organic material such as polyimide, acrylic, or benzocyclobutene can be used. Note that an insulating film including the inorganic material can be formed by a sputtering method, a sol-gel method or the like, and an insulating film including the organic material can be formed by a spin coating method, a printing method, or the like. Then, an unnecessary portion is removed with use of a resist mask, for example, thereby forming the insulating layer 421 covering the first pixel electrode 411. FIG. 2A is a cross-sectional view when up to this step is completed.

Next, the second pixel electrode 412 is formed over the insulating layer 421 and the insulating layer 308. A conductive film to be the second pixel electrode 412 is formed in a manner similar to that of the first pixel electrode 411. Then, an unnecessary portion is removed with use of a resist mask 340 formed using a photomask, thereby forming the second pixel electrode 412. Note that the insulating layer 421 provided over the first pixel electrode 411 functions as an etching stopper and protects the first pixel electrode 411 from etching in this etching step. FIG. 2B is a cross-sectional view when this step is completed.

An unnecessary portion of the insulating layer 421 is removed with use of the resist mask 340, and then the resist mask 340 is removed, thereby manufacturing the pixel electrode illustrated in FIG. 1A, which is one embodiment of the present invention.

The insulating layer 431 is formed so as to cover the side surface of the second pixel electrode 412 over the first pixel electrode 411. A material that can be used for the insulating layer 421 is employed for the insulating layer 431. As a method for forming the insulating layer 431, in stead of a method by which an insulating film is formed and etched with use of a resist mask, a method by which the insulating layer 431 is formed using a photoresist may be employed. Alternatively, the insulating layer 431 can be formed by a printing method or an inkjet method. FIG. 2C is a cross-sectional view when this step is completed.

Through the above steps, the pixel electrode of the liquid crystal display device with a structure in which the second pixel electrode 412 overlaps with the end portion of the adjacent first pixel electrode 411 with the insulating layer 421 interposed therebetween, and the insulating layer 431 covers the side surface of the second pixel electrode 412 over the first pixel electrode 411 can be manufactured.

The liquid crystal display devices described in this embodiment each have a structure in which two adjacent pixel electrodes are provided so as to overlap with each other. A space between the two pixel electrodes is not seen when the display device is viewed from the front. As a result, the ratio of an area of a pixel electrode in each pixel can be increased. A display device including pixel electrodes with such a structure can provide a display image with high luminance and excellent contrast.

In the liquid crystal display device described in this embodiment, which is provided with an insulating layer covering the side surface of the second pixel electrode overlying the top surface of the first pixel electrode, the alignment of liquid crystal is hardly disordered, so that a high-quality image can be displayed. Further, when a layer functioning as a black matrix is used as the insulating layer covering the side surface of the second pixel electrode, the optical density of a dark region (i.e., a shadow portion) in a display image is increased, so that the gradation of the shadow portion can be displayed more clearly.

Note that this embodiment can be combined with any of the other embodiments described in this specification as appropriate.

Embodiment 2

In this embodiment, a structure of a display device including three or more adjacent pixel electrodes in which end portions of the adjacent pixel electrodes overlap with one another with an insulating layer interposed therebetween will be described with reference to FIGS. 3A and 3B and FIGS. 7A and 7B.

Figure 3A:
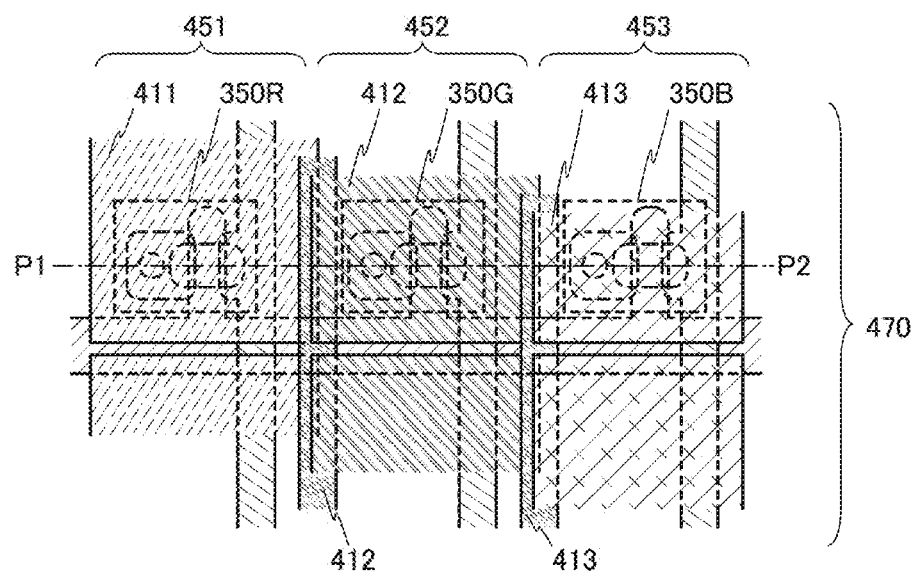
FIGS. 3A and 3B are top views each illustrating a pixel portion according to an embodiment.

FIG. 3A is a top view of a pixel portion of a liquid crystal display device 470 described in this embodiment. The liquid crystal display device 470 includes a first pixel 451, a second pixel 452, and a third pixel 453. The first pixel 451 includes the first pixel electrode 411 and a first transistor 350R. The second pixel 452 includes the second pixel electrode 412 and a second transistor 350G. The third pixel 453 includes a third pixel electrode 413 and a third transistor 350B.

Figure 4:
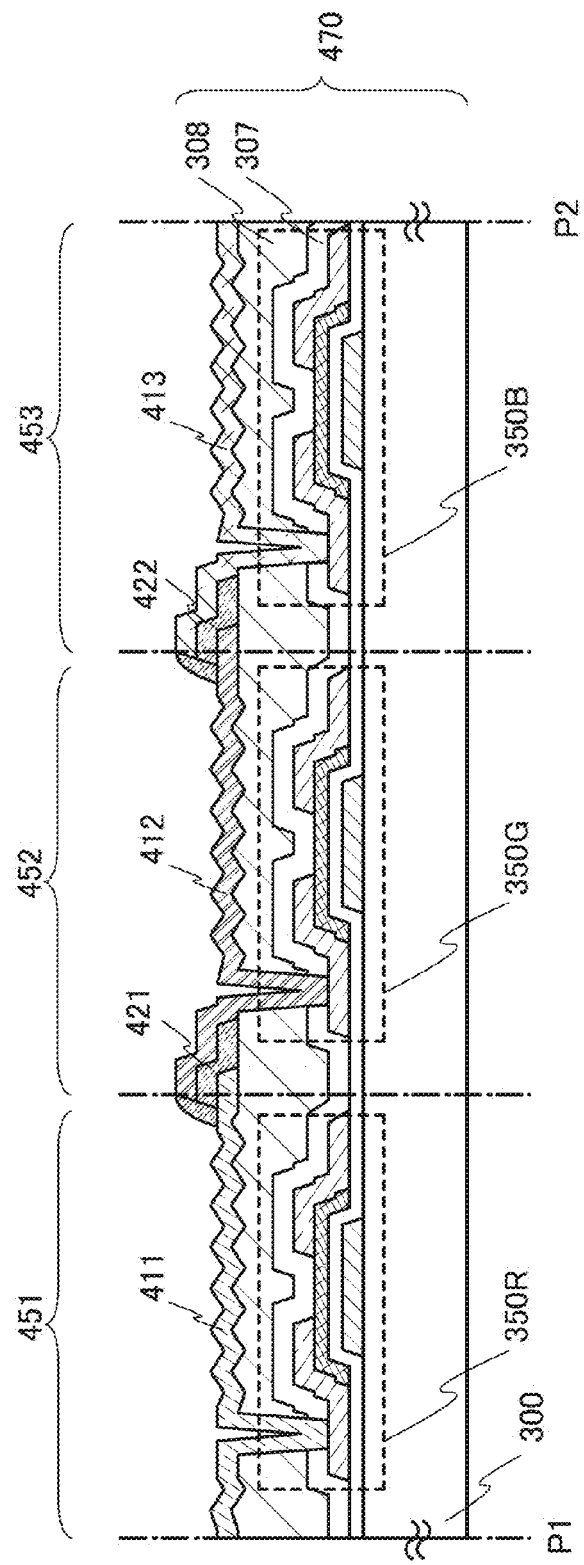
FIG. 4 is a cross-sectional view illustrating a pixel portion according to the embodiment.

FIG. 4 is a cross-sectional view of the liquid crystal display device 470 taken along line P1-P2 in FIG. 3A. The liquid crystal display device 470 includes the three transistors 350R, 350G, and 350B over the substrate 300, the insulating layer 307 covering the transistors, and the insulating layer 308 covering the insulating layer 307. The first pixel electrode 411, the second pixel electrode 412, and the third pixel electrode 413 are formed over the insulating layer 308.

Through openings formed in the insulating layer 307 and the insulating layer 308, the first pixel electrode 411 is electrically connected to a source electrode or a drain electrode of the transistor 350R, the second pixel electrode 412 is electrically connected to a source electrode or a drain electrode of the transistor 350G, and the third pixel electrode 413 is electrically connected to a source electrode or a drain electrode of the transistor 350B.

One end portion of the second pixel electrode 412 overlies the first pixel electrode 411 with the first insulating layer 421 interposed therebetween, and the other end portion of the second pixel electrode 412 underlies the third pixel electrode 413 with the second insulating layer 422 interposed therebetween.

One end portion of a pixel electrode provided between two pixel electrodes overlies the adjacent pixel electrode, and the other end portion thereof underlies the other adjacent pixel electrode. This structure is not limited to the case where three pixel electrodes are arranged, and can be applied to the case where four pixel electrodes are arranged in line. Specifically, the following structure may be used: a left end portion of each of four pixel electrodes is overlies a right end portion of the immediate left pixel electrode.

Figure 3B:
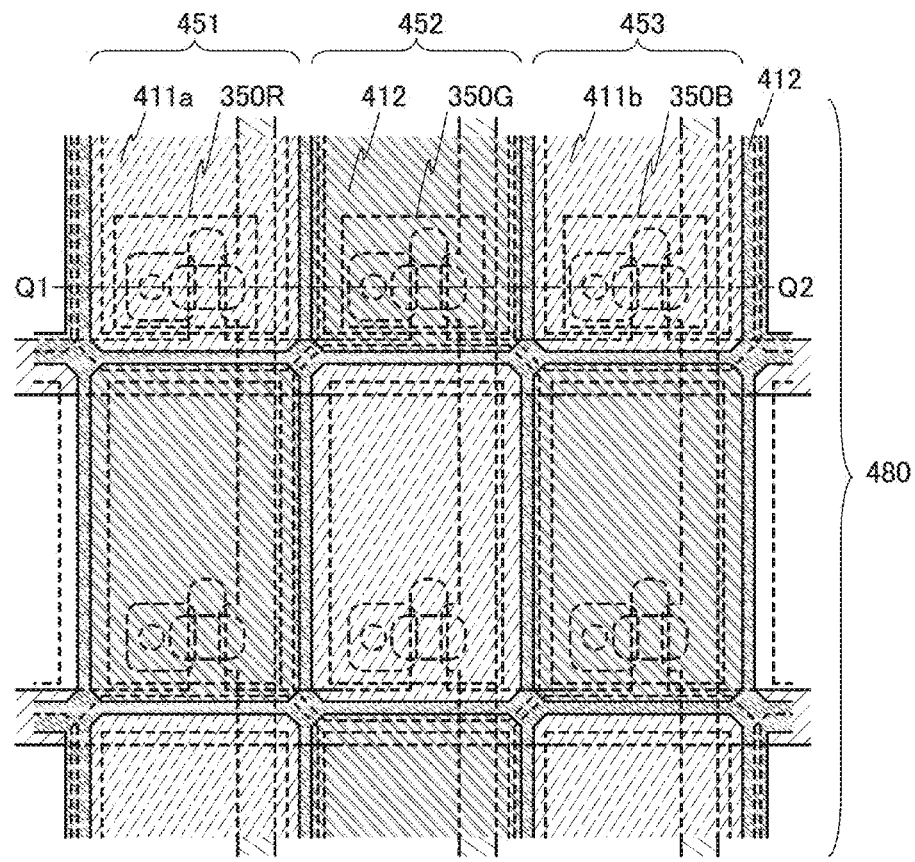

Next, a structure of a pixel electrode, which differs from the structure illustrated in FIG. 3A, will be described. FIG. 3B is a top view of a liquid crystal display device 480. The liquid crystal display device 480 includes the first pixel 451, the second pixel 452, and the third pixel 453. The first pixel 451 includes a first pixel electrode 411a and the first transistor 350R. The second pixel 452 includes the second pixel electrode 412 and the second transistor 350G. The third pixel 453 includes a third pixel electrode 411b and the third transistor 350B.

Figure 5:
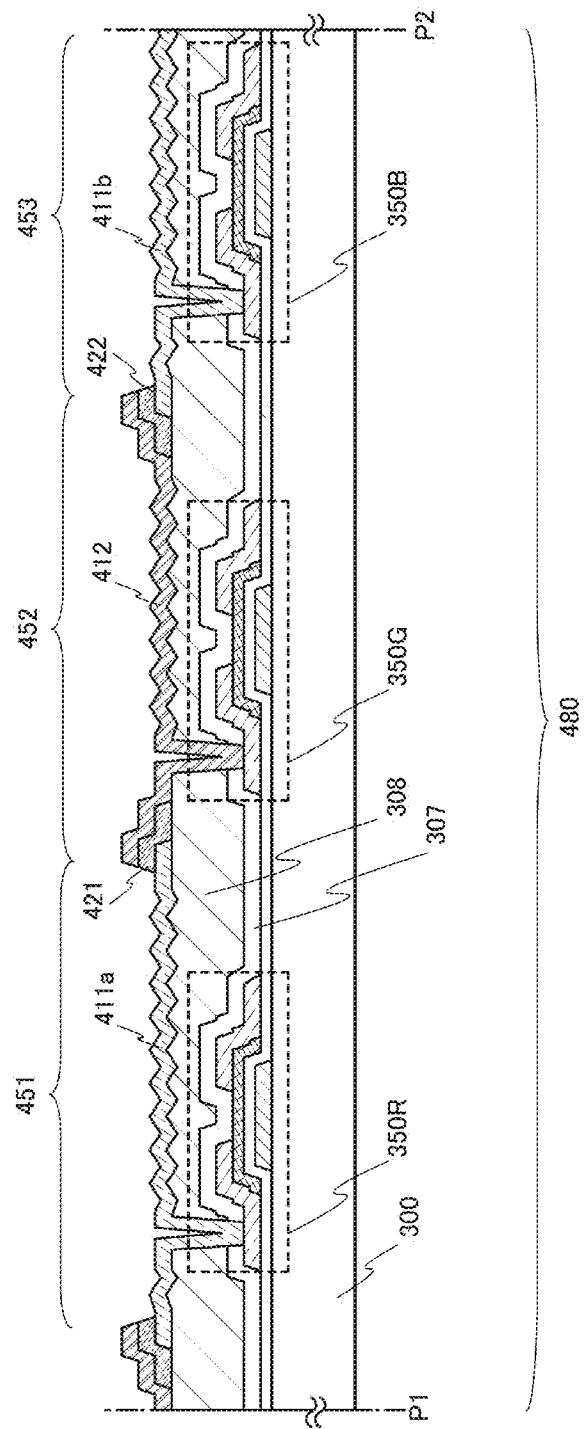
FIG. 5 is a cross-sectional view illustrating a pixel portion according to the embodiment.

FIG. 5 is a cross-sectional view of the liquid crystal display device 480 taken along line Q1-Q2 in FIG. 3B. The liquid crystal display device 480 includes three transistors 350R, 350G, and 350B over the substrate 300, the insulating layer 307 covering the transistors, and the insulating layer 308 covering the insulating layer 307. The first pixel electrode 411a, the second pixel electrode 412, and the third pixel electrode 411b are formed over the insulating layer 308.

Through an opening of the insulating layer 307 and the insulating layer 308, the first pixel electrode 411a is electrically connected to a source electrode or a drain electrode of the transistor 350R, the second pixel electrode 412 is electrically connected to one of a source electrode and a drain electrode of the transistor 350G, and the third pixel electrode 411b is electrically connected to one of a source electrode and a drain electrode of the transistor 350B.

One end portion of the second pixel electrode 412 overlies the first pixel electrode 411a with the first insulating layer 421 interposed therebetween, and the other end portion of the second pixel electrode 412 overlies the third pixel electrode 411b with the second insulating layer 422 interposed therebetween.

The structure in which end portions of a pixel electrode provided between two pixel electrodes overlie end portions of the adjacent pixel electrodes can be applied to the case where three or more pixel electrodes are arranged in line.

Alternatively, the structure in which end portions of a pixel electrode provided between two pixel electrodes underlie end portions of the adjacent pixel electrodes. In other words, in the case where four or more pixel electrodes are arranged, the following two structures are provided alternately: a structure in which end portions of a pixel electrode provided between two pixel electrodes overlie end portions of the adjacent pixel electrodes; and a structure in which end portions of a pixel electrode provided between two pixel electrodes underlie end portions of the adjacent pixel electrodes.

An example of a method for manufacturing the pixel portion of the liquid crystal display device 470 will be described with reference to FIGS. 6A and 6B and FIGS. 7A and 7B. The pixel portion of the liquid crystal display device 470 can be manufactured by a method that is substantially the same as that of Embodiment 1.

The transistors 350R, 350G and 350B and the insulating layers 307 and 308 having openings that reach source electrodes or drain electrodes of the transistors are provided over the substrate 300. Then, the first pixel electrode 411 is formed over the insulating layer 308 by the method described in Embodiment 1, and the first insulating layer 421 is formed over the first pixel electrode 411. FIG. 6A is a cross-sectional view when this step is completed.

Similarly, the second pixel electrode 412 and the second insulating layer 422 are formed as in FIG. 6B, and a conductive film to be the third pixel electrode 413 is formed in a manner similar to that of other pixel electrodes. Then, a resist mask 340a is formed to remove an unnecessary portion, thereby forming the third pixel electrode 413. FIG. 7A is a cross-sectional view when this step is completed.

An unnecessary portion of the second insulating layer 422 is etched away with use of the resist mask 340a. Next, a resist mask 340b is formed over the conductive film to be the second pixel electrode 412, and unnecessary portions of the first pixel electrode 411 and the first insulating layer 421 are removed with use of the resist mask 340b so that the pixel portion of the liquid crystal display device 470 is formed.

An example of a method for manufacturing the pixel portion of the liquid crystal display device 480 illustrated in FIG. 3B and FIG. 5 will be described with reference to FIG. 5.

The transistors 350R, 350G and 350B and the insulating layers 307 and 308 having openings that reach a source electrodes or a drain electrode of the transistors are provided over the substrate 300. Then, a conductive film is formed over the insulating layer 308, and the first pixel electrode 411a and the third pixel electrode 411b are formed with use of a resist mask formed using a photomask.

Next, an insulating film covering the first pixel electrode 411a and the third pixel electrode 411b is formed, and an unnecessary portion of the insulating film is removed with use of a resist mask. Note that the resist mask used here extends beyond the end portions of the first pixel electrode 411a and the third pixel electrode 411b and covers portions to be the first insulating layer 421 and the second insulating layer 422 so that the resist mask protects these portions from an etchant.

Thus, portions of the insulating layer which overlaps with the first pixel electrode 411a and the third pixel electrode 411b are not removed, so that the shape of the insulating layer is different from the shapes of the first insulating layer 421 and the second insulating layer 422.

Next, the resist mask is removed, the conductive film to be the second pixel electrode 412 is formed, and then a resist mask is formed thereover using a photomask. Then, an unnecessary portion is removed with use of the resist mask, thereby forming the second pixel electrode 412.

With use of the resist mask used for forming the second pixel electrode 412, unnecessary portions of the insulating layer which overlap with the first pixel electrode 411a and the third pixel electrode 411b are etched away so that the first insulating layer 421 and the second insulating layer 422 are formed.

The structure illustrated in FIG. 3B and FIG. 5 in which end portions of a pixel electrode provided between two pixel electrodes overlie end portions of the adjacent pixel electrodes can be formed by the formation of pixel electrodes in two separate steps, which is relatively easy. Similarly, it is also relatively easy to form the structure in which end portions of a pixel electrode provided between two pixel electrodes underlie end portions of the adjacent pixel electrodes.

With a structure in which three or more adjacent pixel electrodes are provided so that end portions of the adjacent pixel electrodes overlap with one another with an insulating layer interposed therebetween, a space between the two pixel electrodes is not seen when the display device is viewed from the front. As a result, the ratio of an area of a pixel electrode in each pixel can be increased. A display device including pixel electrodes with such a structure can display an image with high luminance and high contrast.

Note that this embodiment can be combined with any of the other embodiments described in this specification as appropriate.

Embodiment 3

In this embodiment, a liquid crystal display device which includes the pixel electrodes described in Embodiments 1 and 2 and further includes a photodiode as a photo sensor over one substrate will be described with reference to FIG. 8, FIG. 9, and FIGS. 10A and 10B.

Figure 8:
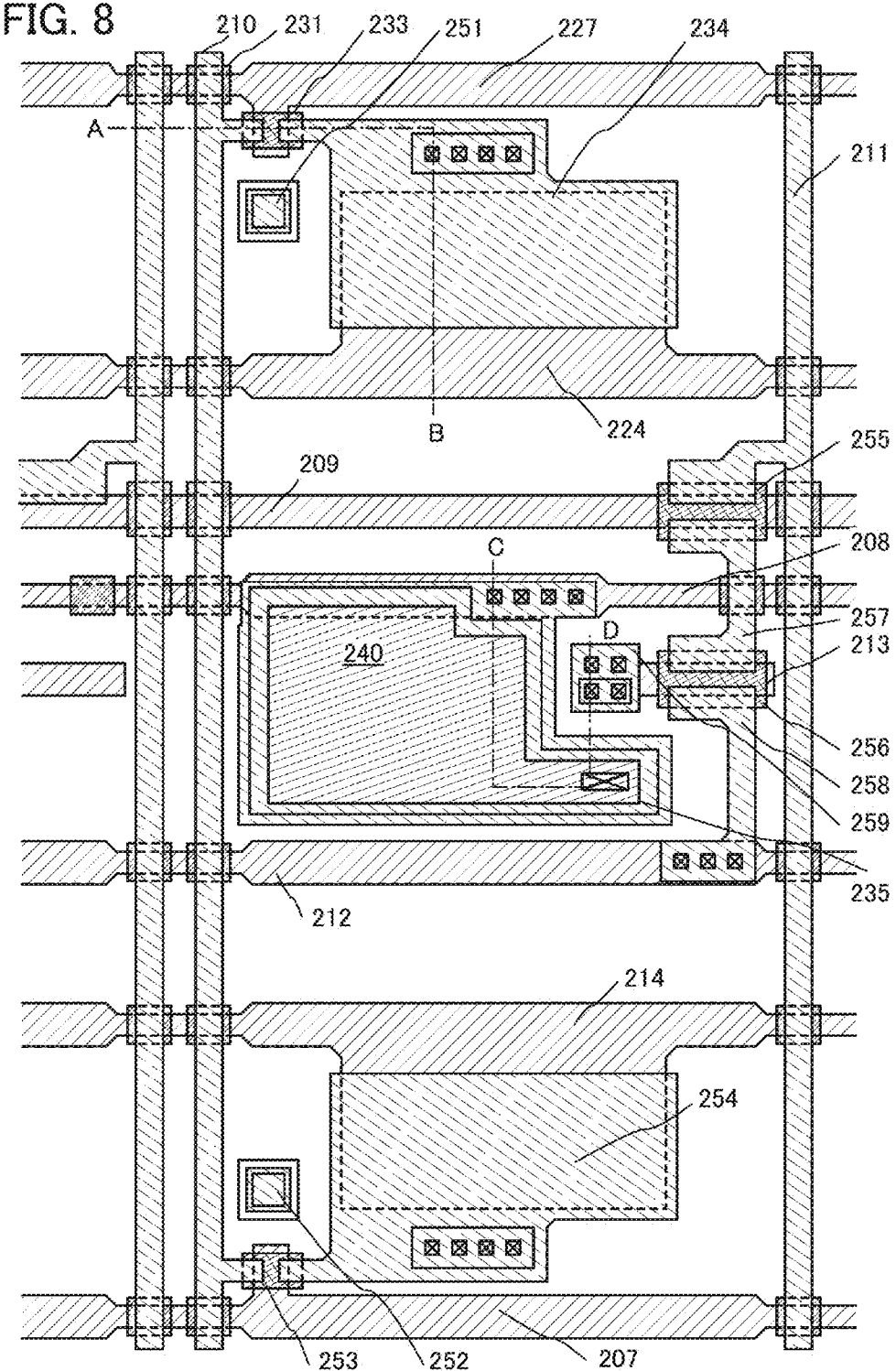
FIG. 8 is a top view illustrating a pixel portion according to an embodiment.

FIG. 8 is an example of a top view of a pixel, which illustrates a state before an electrode of a photodiode is formed. Note that cross-sectional views taken along chain line A-B and chain line C-D in FIG. 8 correspond to FIG. 10A.

Next, a method for manufacturing the liquid crystal display device described in this embodiment will be described mainly using FIG. 8 together with FIGS. 10A and 10B. First, a conductive film is formed over a substrate 230, and then gate signal lines 207, 213, and 227 including gate electrodes, a capacitor wiring 224, a photodiode reset signal line 208, a reading signal line 209, and a photo sensor reference signal line 212 are formed through a first photolithography process using a first light-exposure mask. Note that in this embodiment, a glass substrate is used as the substrate 230.

An insulating film serving as a base film may be provided between the substrate 230 and the conductive film (see FIGS. 10A and 10B). The base film has a function of preventing diffusion of an impurity element from the substrate 230. The base film can be formed with a single-layer structure or a layered structure including one or more of a silicon nitride film, a silicon oxide film, a silicon nitride oxide film, and a silicon oxynitride film.

The conductive film can be formed with a single-layer structure or a layered structure including a metal material such as molybdenum, titanium, tantalum, tungsten, aluminum, copper, neodymium, or scandium, or an alloy material which contains any of these metal materials as its main component.

Next, an insulating layer is formed to cover these wirings, and selectively etched through a second photolithography process using a second light-exposure mask so that the insulating layer 231 is formed in only portions where wirings formed later intersect with each other. In this embodiment, a 600-nm-thick silicon oxynitride film is used as the insulating layer 231.

Then, a gate insulating layer 232 and an oxide semiconductor film are formed (see FIGS. 10A and 10B), and a first oxide semiconductor layer 233, a second oxide semiconductor layer 253, a third oxide semiconductor layer 255, and a fourth oxide semiconductor layer 256 are formed through a third photolithography process using a third light-exposure mask. The first oxide semiconductor layer 233, the second oxide semiconductor layer 253, the third oxide semiconductor layer 255, and the fourth oxide semiconductor layer 256 overlap with the gate signal lines 207, 213, and 227 and the reading signal line 209, respectively, with the gate insulating layer 232 provided therebetween. In this embodiment, a 100-nm-thick silicon oxynitride film is used as the gate insulating layer 232, and a 25-nm-thick In—Ga—Zn—O film is used as the oxide semiconductor layer.

An oxide thin film represented by a chemical formula $InMO_3(ZnO)_m$ (m>0) can be used for the first oxide semiconductor layer 233, the second oxide semiconductor layer 253, the third oxide semiconductor layer 255, and the fourth oxide semiconductor layer 256. Here, M represents one or more metal elements selected from Ga, Al, Mn, and Co. For example, M can be Ga, Ga and Al, Ga and Mn, Ga and Co, or the like. Further, $SiO_2$ may be contained in the above oxide thin film.

As the target for forming the oxide thin film by a sputtering method, for example, an oxide target having a composition ratio of $In_2O_3:Ga_2O_3:ZnO=1:1:1$ [molar ratio] is used to form an In—Ga—Zn—O film. Without limitation on the material and the component of the target, for example, an oxide target having a composition ratio of $In_2O_3:Ga_2O_3:ZnO=1:1:2$ [molar ratio] may be used. Note that in this specification, for example, an In—Ga—Zn—O film means an oxide film including indium (In), gallium (Ga), and zinc (Zn), and there is no particular limitation on the stoichiometric proportion.

Next, the oxide semiconductor layer is subjected to first heat treatment. The oxide semiconductor layer can be dehydrated or dehydrogenated by the first heat treatment. The temperature of the first heat treatment is higher than or equal to 400° C. and lower than or equal to 750° C., or higher than or equal to 400° C. and lower than the strain point of the substrate. In this embodiment, heat treatment is performed using a rapid thermal annealing (RTA) apparatus at 650° C. for 6 minutes under a nitrogen atmosphere; the substrate is introduced to an electric furnace that is one of heat treatment apparatuses without exposure to the air; and the oxide semiconductor layer is subjected to heat treatment at 450° C. for one hour under a nitrogen atmosphere; thus, the oxide semiconductor layer can be obtained without entry of water or hydrogen into the oxide semiconductor layer.

The gate insulating layer 232 is selectively removed through a fourth photolithography process using a fourth light-exposure mask, thereby forming an opening that reaches the gate signal line 213 and an opening that reaches the photodiode reset signal line 208 (see FIGS. 10A and 10B).

Next, a conductive film is formed over the gate insulating layer 232 and the oxide semiconductor layer. As the conductive film, for example, a metal film containing an element selected from Al, Cr, Cu, Ta, Ti, Mo, and W, an alloy film containing a nitride of any of these elements, an alloy film containing a combination of any of these elements, or the like can be employed. Then, a resist mask is formed over the conductive film through a fifth photolithography process using a fifth light-exposure mask and etching is selectively performed, thereby forming a video data signal line 210, a photo sensor output signal line 211, and electrode layers 234, 235, 254, 257, 258, and 259.

Note that a transistor including the first oxide semiconductor layer 233 illustrated in FIG. 8 is a transistor in which the electrode layer 234 serves as a source electrode layer or a drain electrode layer, and functions as a switching element of a pixel. As illustrated in FIGS. 10A and 10B, a storage capacitor 222 is formed by the electrode layer 234 and the capacitor wiring 224, using the gate insulating layer 232 as a dielectric. A transistor including the second oxide semiconductor layer 253 illustrated in FIG. 8 is a transistor in which the electrode layer 254 serves as a source electrode layer or a drain electrode layer, and functions as a switching element of a pixel.

A transistor including the third oxide semiconductor layer 255 illustrated in FIG. 8 is a transistor in which the electrode layer 257 serves as a source electrode layer or a drain electrode layer, and is one component of a photo sensor.

A transistor including the fourth oxide semiconductor layer 256 illustrated in FIG. 8 is a transistor in which the electrode layer 257 or the electrode layer 258 serves as a source electrode layer or a drain electrode layer. As illustrated in FIG. 10A, the gate signal line 213 of the transistor is electrically connected to the electrode layer 259.

Next, second heat treatment is performed under an inert gas atmosphere or oxygen gas atmosphere (preferably at higher than or equal to 200° C. and lower than or equal to 400° C., for example, higher than or equal to 250° C. and lower than or equal to 350° C.). In this embodiment, the second heat treatment is performed at 300° C. for one hour under a nitrogen atmosphere. Through the second heat treatment, part of the oxide semiconductor layer (a channel formation region) is heated while being in contact with the insulating layer.

Then, an insulating layer 237 to be a protective insulating layer is formed, and an opening that reaches the electrode layer 235, an opening that reaches the electrode layer 234, and an opening that reaches the electrode layer 259 are formed through a sixth photolithography process using a sixth light-exposure mask.

Next, a p-layer 238, an i-layer 239, and an n-layer 240 are stacked by a plasma CVD method. In this embodiment, a 45-nm-thick microcrystalline silicon film containing boron as the p-layer 238, a 400-nm-thick amorphous silicon film as the i-layer 239, an 80-nm-thick microcrystalline silicon film containing phosphorus as the n-layer 240 are employed. Through a seventh photolithography process using a seventh light-exposure mask, the p-layer 238, the i-layer 239, and the n-layer 240 are removed except a portion in contact with and overlapping with the electrode layer 235. FIG. 10A is a cross-sectional view when this step is completed and FIG. 8 is a top view thereof.

Then, a photosensitive organic resin layer is formed, an eighth photolithography process is performed through which a region to be an opening is exposed to light using an eighth light-exposure mask, a region to be uneven (a region having a texture structure) is exposed to light using a ninth light-exposure mask and developed, thereby forming an insulating layer 241 partly having unevenness.

Next, a first pixel electrode, a second pixel electrode, and a third pixel electrode are manufactured. In this embodiment, the method described in Embodiment 2 with reference to FIGS. 3A and 3B, FIG. 4, FIGS. 6A and 6B, and FIGS. 7A and 7B is employed, and description is made without a specific drawing here.

Specifically, a conductive film having reflectivity to be the first pixel electrode is formed and a ninth photolithography process using a tenth light-exposure mask is performed. Then, an insulating layer to be a first insulating layer is formed to cover the conductive film to be the first pixel electrode, and a tenth photolithography process using an eleventh light-exposure mask is performed.

Next, a conductive film having reflectivity to be the second pixel electrode is formed and an eleventh photolithography process using a twelfth light-exposure mask is performed. Then, an insulating layer to be a second insulating layer is formed to cover the conductive film to be the second pixel electrode, and a twelfth photolithography process using a thirteenth light-exposure mask is performed.

Next, a conductive film having reflectivity to be the third pixel electrode is formed, and a thirteenth photolithography process using a fourteenth light-exposure mask is performed, thereby forming the third pixel electrode and a second insulating layer. Then, a fourteenth photolithography process using a fifteenth light-exposure mask is performed so that the second pixel electrode, the first insulating layer, and the first pixel electrode are formed. Further, a connection electrode layer 243 is formed in a manufacturing process of the pixel electrodes (see FIG. 9). The photodiode 204 and the gate signal line 213 are electrically connected to each other through the connection electrode layer 243.

Note that Al, Ag, or an alloy thereof such as aluminum containing Nd or an Ag—Pd—Cu alloy is used as the conductive film having reflectivity. After the ninth photolithography process, third heat treatment is performed. In this embodiment, the third heat treatment is performed at 250° C. for one hour under a nitrogen atmosphere.

Through the above steps, as illustrated in FIG. 10B, a reflective electrode layer 242 whose end portion overlaps with an end portion of the adjacent reflective electrode with an insulating layer interposed therebetween, a transistor electrically connected to the reflective electrode layer 242, and the photodiode 204 electrically connected to the gate signal line 213 through the connection electrode layer 243 can be formed over one substrate, by fourteen photolithography processes with use of fifteen light-exposure masks in total.

An alignment film 244 is formed to cover the reflective electrode layer 242. FIG. 10B is a cross-sectional view of this step. Thus, an active matrix substrate can be manufactured.

Then a counter substrate to be bonded to the active matrix substrate is prepared. In the counter substrate, a light-blocking layer (also referred to as a black matrix) and a light-transmitting conductive film are formed to surround a light-receiving portion of a photo sensor, and a columnar spacer including an organic resin is further formed. Then, an alignment film is formed to cover them.

The counter substrate is bonded to the active matrix substrate with use of a sealing material, and a liquid crystal layer is interposed between the pair of substrates. Note that the light-blocking layer of the counter substrate is formed so that the light-blocking layer surrounds a photodiode and does not overlap with the reflective electrode layer 242 and an exposed region of the photodiode. The columnar spacer provided on the counter substrate is positioned so as to overlap with the electrode layers 251 and 252. Since the columnar spacer overlaps with the electrode layers 251 and 252, the pair of substrates is held at a certain distance. The electrode layers 251 and 252 can be formed in the same step as that of the electrode layer 234; thus, it is not necessary to increase the number of masks.

FIG. 9 is a top view of a pixel in the pair of substrates which are bonded in such a manner. The reflective electrode layer 242 has a random plane pattern illustrated in FIG. 9 because the reflective electrode layer 242 is provided over the photosensitive organic resin layer having an uneven shape. The surface shape of the photosensitive organic resin layer is reflected on a surface of the reflective electrode layer 242 so that the surface of the reflective electrode layer 242 has an uneven shape; thus, specular reflection is prevented.

Note that FIG. 9 also illustrates a depressed portion 245 of the reflective electrode layer 242. The periphery of the depressed portion 245 is located on an inner side than the periphery of the reflective electrode layer 242, and the photosensitive organic resin layer below the depressed portion 245 has a smaller thickness than other regions.

If necessary, a surface of the counter substrate where external light enters may be provided with an optical film such as a retardation film for adjusting phase difference, a film having a polarization function, an anti-reflection plate, or a color filter.

Note that this embodiment can be combined with any of the other embodiments described in this specification as appropriate.

Embodiment 4

In this embodiment, a method for driving a liquid crystal display device in which a pixel electrode and a photo sensor are formed over one substrate and an end portion of the pixel electrode overlaps with an end portion of an adjacent pixel electrode with an insulating layer interposed therebetween will be described.

Figure 11:
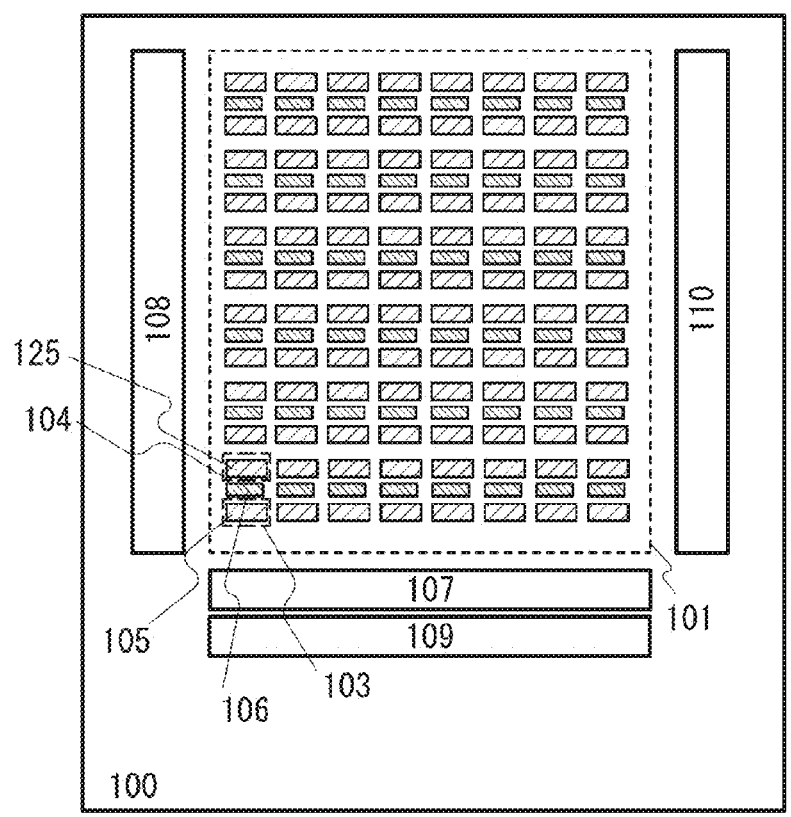
FIG. 11 is a block diagram illustrating a liquid crystal display device according to an embodiment.

An example of a display panel in which the pixel electrode described in Embodiment 3 and a photo sensor are formed over one substrate will be described with reference to FIG. 11. A display panel 100 includes a pixel circuit 101, a display element control circuit, and a photo sensor control circuit. The pixel circuit 101 includes a plurality of pixels 103 and 104 and a plurality of photo sensors 106 which are arranged in a matrix of rows and columns. Each of the pixels 104 and 103 includes one display element. Although in this embodiment, one photo sensor 106 is provided between the pixel 103 and the pixel 104 and the number of the photo sensors is half of the number of the pixels, an embodiment is not limited thereto. One photo sensor may be provided per one pixel so that the number of the photo sensors is the same as the number of the pixels. Alternatively, the number of the photo sensors may be one third of the number of the pixels.

A display element 105 includes a liquid crystal element including a transistor, a storage capacitor, and a liquid crystal layer, or the like. The transistor has a function of controlling injection or discharge of charge to/from the storage capacitor. The storage capacitor has a function to retain charge which corresponds to voltage applied to the liquid crystal layer. Taking advantage of the change in the direction of a polarization due to a voltage application to the liquid crystal layer, contrast (gray scale) of light passing through the liquid crystal layer is made, so that image display is realized. External light which enters from a surface side of a liquid crystal display device is used as the light passing through the liquid crystal layer.

The liquid crystal element in this embodiment has a structure in which an end portion of a pixel electrode overlaps with an end portion of an adjacent pixel electrode with an insulating layer interposed therebetween. Thus, a space between adjacent pixels can be narrowed, so that the area of a pixel that reflects external light can be increased. The structure with which a space between adjacent pixels can be narrowed is suitable particularly in the case where a display element and a photo sensor are formed over one substrate because the area of a pixel electrode of the display element is limited.

Further, the display element control circuit is a circuit configured to control the display elements 105 and includes a display element driver circuit 107 which inputs a signal to the display elements 105 through signal lines (also referred to as source signal lines) such as video data signal lines, and a display element driver circuit 108 which inputs a signal to the display elements 105 through scan lines (also referred to as gate signal lines).

For example, the display element driver circuit 108 on the scan line side has a function of selecting the display elements included in the pixels placed in a particular row. The display element driver circuit 107 on the signal line side has a function of applying a predetermined potential to the display elements included in the pixels placed in a selected row. Note that in the display element to which the display element driver circuit 108 on the scan line side applies high potential, the transistor is brought into conduction, so that the display element is supplied with charge from the display element driver circuit 107 on the signal line side.

The photo sensor 106 includes a transistor and a light-receiving element which has a function of generating an electrical signal when receiving light, such as a photodiode.

The photo sensor control circuit is a circuit configured to control the photo sensors 106 and includes a photo sensor reading circuit 109 on the signal line side for a photo sensor output signal line, a photo sensor reference signal line, or the like, and a photo sensor driver circuit 110 on the scan line side. The photo sensor driver circuit 110 on the scan line side has a function of performing reset operation and selecting operation on the photo sensors 106 included in the pixels placed in a particular row, which is described below. Further, the photo sensor reading circuit 109 on the signal line side has a function of taking out an output signal of the photo sensors 106 included in the pixels in the selected row.

Figure 12:
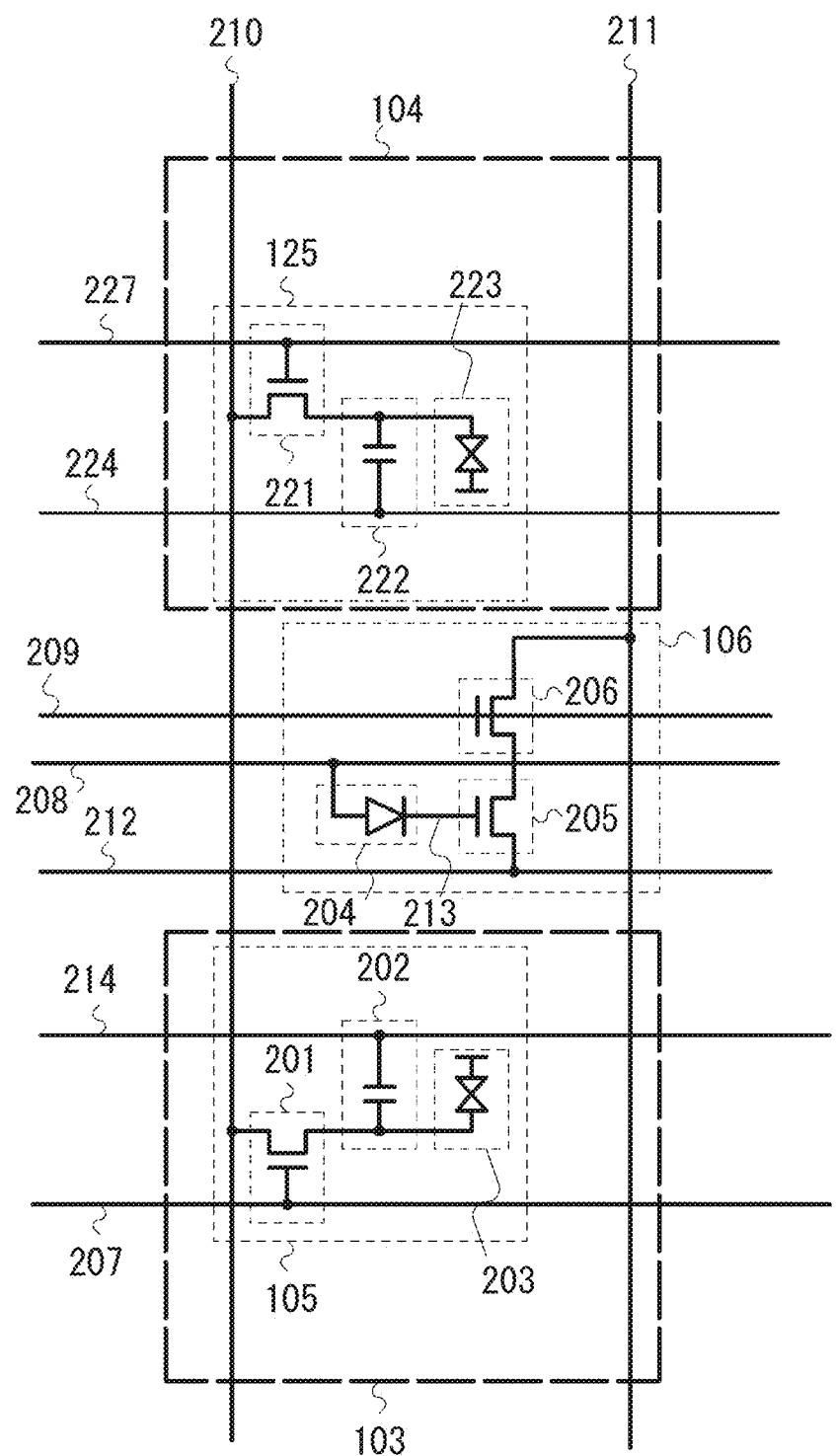
FIG. 12 is an equivalent circuit diagram illustrating a liquid crystal display device according to the embodiment.

A circuit diagram of the pixel 103, the photo sensor 106, and the pixel 104 is described in this embodiment with reference to FIG. 12. The pixel 103 includes the display element 105 including a transistor 201, a storage capacitor 202, and a liquid crystal element 203. The photo sensor 106 includes a photodiode 204, a transistor 205, and a transistor 206. The pixel 104 includes a display element 125 including a transistor 221, a storage capacitor 222, and a liquid crystal element 223.

A gate of the transistor 201 is electrically connected to a gate signal line 207, one of a source and a drain of the transistor 201 is electrically connected to a video data signal line 210, and the other of the source and the drain of the transistor 201 is electrically connected to one electrode of the storage capacitor 202 and one electrode of the liquid crystal element 203. The other electrode of the storage capacitor 202 is electrically connected to a capacitor wiring 214 and held at a fixed potential. The other electrode of the liquid crystal element 203 is held at a fixed potential. The liquid crystal element 203 is an element including a pair of electrodes and a liquid crystal layer provided between the pair of electrodes.

When a potential "H" is applied to the gate signal line 207, the transistor 201 supplies the potential of the video data signal line 210 to the storage capacitor 202 and the liquid crystal element 203. The storage capacitor 202 retains the applied potential. The liquid crystal element 203 changes light transmittance in accordance with the applied potential.

One electrode of the photodiode 204 is electrically connected to a photodiode reset signal line 208, and the other electrode of the photodiode 204 is electrically connected to a gate of the transistor 205. One of a source and a drain of the transistor 205 is electrically connected to a photo sensor reference signal line 212, and the other of the source and the drain of the transistor 205 is electrically connected to one of a source and a drain of the transistor 206. A gate of the transistor 206 is electrically connected to a reading signal line 209, and the other of the source and the drain of the transistor 206 is electrically connected to a photo sensor output signal line 211.

A gate of the transistor 221 is electrically connected to a gate signal line 227, one of a source and a drain of the transistor 221 is electrically connected to the video data signal line 210, and the other of the source and the drain of the transistor 221 is electrically connected to one electrode of the storage capacitor 222 and one electrode of the liquid crystal element 223. The other electrode of the storage capacitor 222 is electrically connected to a capacitor wiring 224 and held at a fixed potential. The other electrode of the liquid crystal element 223 is held at a fixed potential. The liquid crystal element 223 includes a pair of electrodes and a liquid crystal layer provided between the pair of electrodes.

Next, an example of a structure of the photo sensor reading circuit 109 is described with reference to FIG. 12 and FIG. 13. For example, the display portion includes pixels provided in 1024 rows and 768 columns. One display element is provided in one pixel in each row and each column and one photo sensor is provided between two pixels in two rows and one column. That is, the display elements are provided in 1024 rows and 768 columns, and the photo sensors are provided in 512 rows and 768 columns. In addition, this embodiment describes an example in which output to the outside of the display device is performed in the case where photo sensor output signal lines in two columns are regarded as one pair. That is, one output is obtained from two photo sensors provided between four pixels in two rows and two columns.

FIG. 12 illustrates a circuit configuration of pixels, in which two pixels and one photo sensor in two rows and one column are illustrated. One display element is provided in one pixel and one photo sensor is provided between two pixels. FIG. 13 illustrates a circuit configuration of the photo sensor reading circuit 109, in which some photo sensors are illustrated for explanation.

Figure 13:
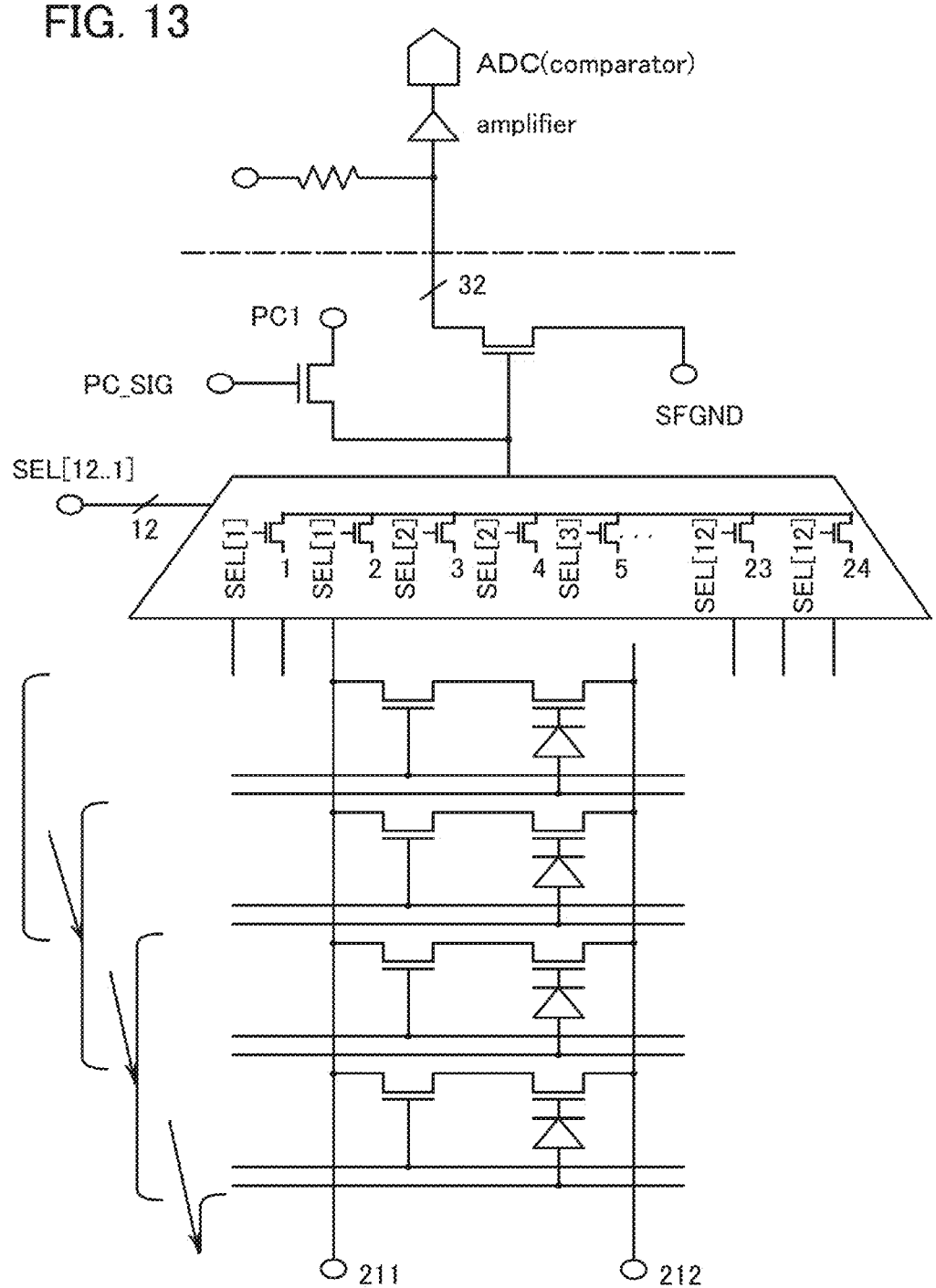
FIG. 13 is a schematic view illustrating a driver circuit of a photo sensor according to the embodiment.

As illustrated in FIG. 13, an example of a driving method described below is considered: by a scan line driver circuit of photo sensors, two rows of photo sensors which correspond to four rows of pixels are driven concurrently, and selected rows are shifted by one row of photo sensors which corresponds to two rows of pixels. In that case, each row of photo sensors is successively selected twice by the scan line driver circuit. Such a driving method facilitates improving frame frequency at the time of imaging by a photo sensor. In particular, it is advantageous in the case of a large-sized display device. Note that outputs of photo sensors in two rows are superimposed on the photo sensor output signal line 211 at one time. All of the photo sensors can be driven by repeating shift of selected rows 512 times.

As illustrated in FIG. 13, in the photo sensor reading circuit 109, one selector is provided per pixels in 24 columns. The selector selects one pair from 12 pairs of photo sensor output signal lines 211 (one pair corresponds to photo sensor output signal lines 211 in two columns) in the display portion and obtains an output. In other words, the photo sensor reading circuit 109 includes 32 selectors in total and obtains 32 outputs at one time. Selection is performed on all of the 12 pairs in each selector, whereby 384 outputs which correspond to one row of photo sensors can be obtained in total. The selector selects one pair from the 12 pairs every time selected rows are shifted by the scan line driver circuit of photo sensors, whereby outputs from all of the photo sensors can be obtained.

In this embodiment, as illustrated in FIG. 13, the following structure is considered: the photo sensor reading circuit 109 on the signal line side takes out outputs of photo sensors, which are analog signals, to the outside of the display device, and the outputs are amplified with use of an amplifier provided outside the display device and converted to digital signals with use of an AD converter. Needless to say, the following structure may be employed: the AD converter is mounted on a substrate over which the display device is provided, and the outputs of photo sensors are converted to digital signals and then the digital signals are taken out to the outside of the display device.

In addition, operation of individual photo sensors is realized by repeating reset operation, accumulating operation, and selecting operation. The "reset operation" refers to operation in which the potential of the photodiode reset signal line 208 is set to a potential "H". When the reset operation is performed, the photodiode 204 is brought into conduction, and the potential of a gate signal line 213 connected to the gate of the transistor 205 is set to a potential "H".

The "accumulating operation" refers to operation in which the potential of the photodiode reset signal line 208 is set to a potential "L" after the reset operation. Further, the "selecting operation" refers to operation in which the potential of the reading signal line 209 is set to a potential "H" after the accumulating operation.

When the accumulating operation is performed, the potential of the gate signal line 213 to which the gate of the transistor 205 is connected is reduced as light with which the photodiode 204 is irradiated is stronger, and a channel resistance of the transistor 205 is increased. Therefore, when the selecting operation is performed, a current which flows to the photo sensor output signal line 211 through the transistor 206 is small. On the other hand, as the light with which the photodiode 204 is irradiated is weaker at the time of the accumulating operation, a current which flows to the photo sensor output signal line 211 through the transistor 206 is increased at the time of the selecting operation.

In this embodiment, when the reset operation, the accumulating operation, and the selecting operation are performed on the photo sensors, a partial shadow of external light can be detected. In addition, when image processing or the like is performed on the detected shadow appropriately, a position where a finger, a pen, or the like touches the display device can be recognized. Operation corresponding to the position where the display device is touched, for example, as for input of letters, kinds of letters are regulated in advance, so that desired letters can be input.

Note that in the display device in this embodiment, the partial shadow of external light is detected by the photo sensors. Therefore, even if a finger, a pen, or the like does not touch the display device physically, when the finger, the pen, or the like gets close to the display device without contact and a shadow is formed, detection of the shadow is possible. Hereinafter, "a finger, a pen, or the like touches the display device" includes the case where the finger, the pen, or the like is close to the display device without contact.

With the above structure, the display portion 1032 can have a touch-input function.

In the case where touch input is performed, the display device has a structure in which an image partly including a still image such as a keyboard is displayed and input is performed by touching a position where a keyboard or a desired letter is displayed with a finger or a pen, whereby operability is improved. In the case where such a display device is realized, power consumption in the display device can be considerably reduced in the following manner. That is, in a first screen region where the still image is displayed on the display portion, it is effective that supply of power to display elements in the first screen region is stopped after the still image is displayed and that a state in which the still image can be seen is kept for a long time after the stop of supply. In a second screen region that is the rest of the display portion, a result from the touch input is displayed, for example. The display element control circuit is in a non-operation state in a period other than the time of updating the displayed image in the second screen region, whereby power can be saved. A driving method which enables the above control is described below.

Figure 14:
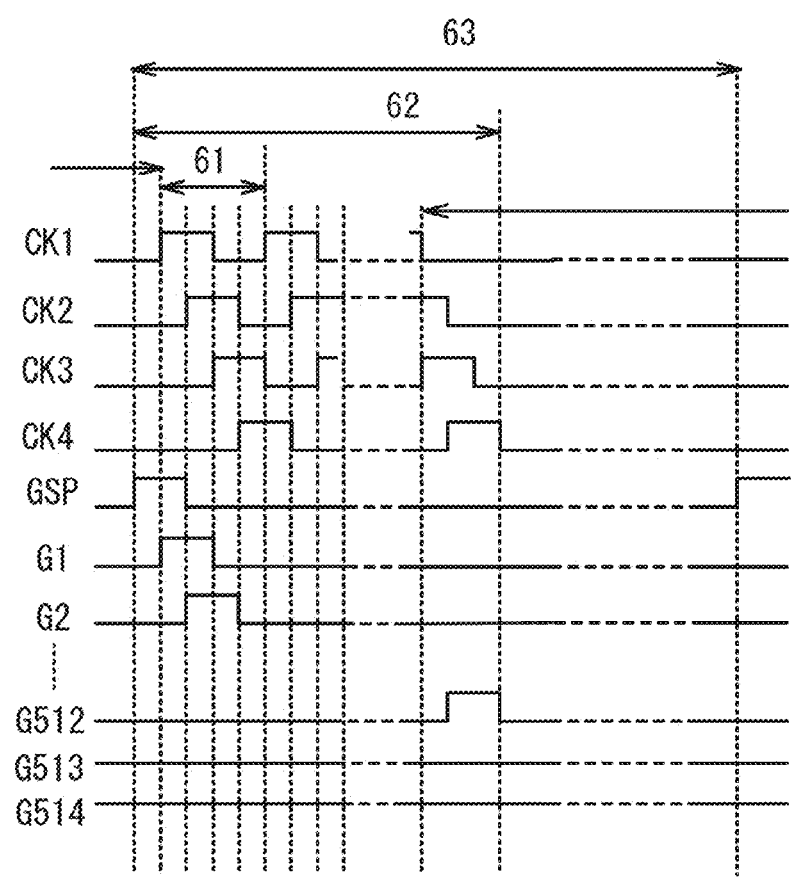
FIG. 14 is a timing chart of a liquid crystal display device according to the embodiment.

For example, FIG. 14 shows a timing chart of a shift register of the scan line driver circuit in the display device including the display portion in which the display elements are arranged in 1024 rows and 768 columns. A period 61 in FIG. 14 corresponds to one cycle period (64.8 μsec) of a clock signal. A period 62 corresponds to a period (8.36 msec) which is needed for finishing writing of the display elements from a 1st to 512th rows corresponding to the second screen region. A period 63 corresponds to one frame period (16.7 msec).

Here, the shift register of the scan line driver circuit is a four-phase-clock-type shift register which is operated by a first clock signal CK1 to a fourth clock signal CK4. In addition, the first clock signal CK1 to the fourth clock signal CK4 are sequentially delayed by a quarter of one cycle period. When a start pulse signal GSP is set to a potential "H", a gate signal line G1 in a 1st row to a gate signal line G512 in a 512th row are set to a potential "H" in sequence with a delay of a quarter of one cycle period. In addition, each of the gate signal lines is set at a potential "H" during half of one cycle period, and two gate signal lines in successive rows are set at a potential "H" concurrently during a quarter of one cycle period.

Here, the display elements in each row are continuously selected in a period in which the scan line driver circuit shifts selected rows twice. When data of the displayed image are input in the latter half of a period in which the display elements in the row are selected, the displayed image can be updated.

Here, in a period other than a period in which the displayed image by the display elements from the 1st row to the 512th row which correspond to the second screen region is updated, the display element control circuit is in a non-operation state. That is, the displayed image by display elements in a 513th row to a 1024th row corresponding to the first screen region is not updated and the display element control circuit is in a non-operation state.

The non-operation state of the display element control circuit can be realized by stopping the clock signal (keeping a clock signal at a potential "L") as shown in FIG. 14. It is effective to stop of supply of power supply voltage at the same time as the stop of the clock signal.

In addition, supply of a clock signal and a start pulse signal may be stopped also in the driver circuit on the source in a period in which the display elements corresponding to the second screen region are not selected, that is, in a period in which the displayed image is not updated. In such a manner, power can be further saved.

Note that this embodiment can be combined with any of the other embodiments described in this specification as appropriate.

Embodiment 5

In this embodiment, an example of a liquid crystal display module capable of full-color display in which a color filter is provided will be described.

Figure 15:
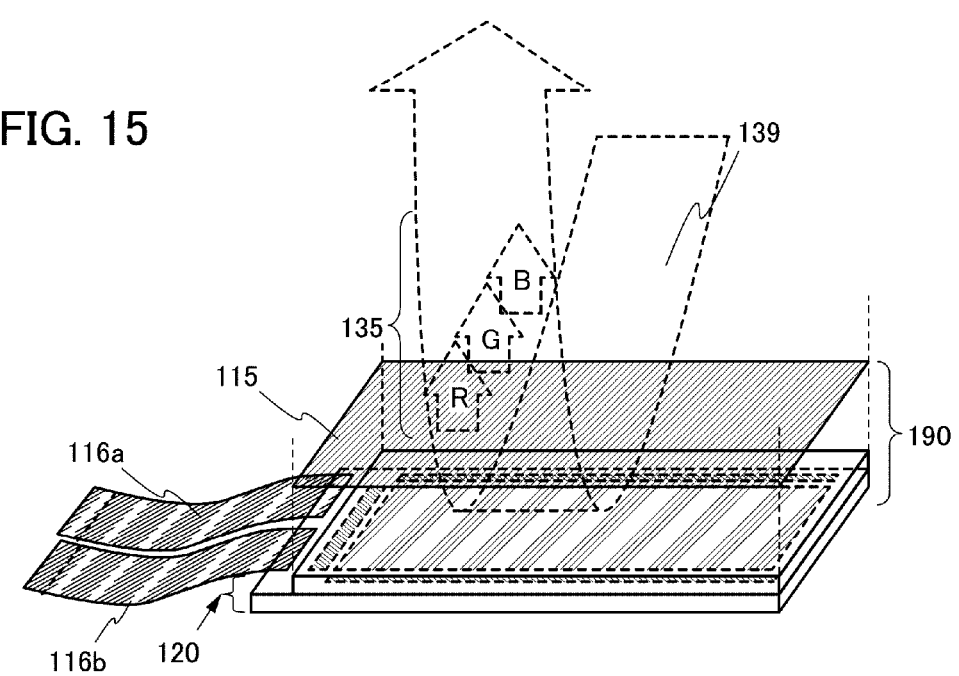
FIG. 15 is a diagram illustrating a liquid crystal display device according to an embodiment.

FIG. 15 illustrates a structure of a liquid crystal display module 190. The liquid crystal display module 190 includes a display panel 120 in which liquid crystal elements are provided in matrix, and a polarizing plate and a color filter 115 which overlap with the display panel 120. In addition, flexible printed circuits (FPCs) 116a and 116b serving as external input terminals are electrically connected to a terminal portion provided in the display panel 120. The display panel 120 has the same structure as the display panel 100 described in Embodiment 1. Note that since full-color display is employed, the display panel 120 uses three display elements of a red display element, a green display element, and a blue display element and has a circuit configuration in which the three display elements are supplied with respective video signals different from each other.

Further, FIG. 15 schematically illustrates a state in which external light 139 is transmitted through the liquid crystal elements over the display panel 120 and reflected at the reflective electrode. For example, in a pixel overlapping with a red region of the color filter, the external light 139 is transmitted through the color filter 115 and then through the liquid crystal layer, reflected at the reflective electrode, and transmitted again through the color filter 115 to be extracted as red light. FIG. 15 schematically illustrates light 135 of three colors by arrows R, G, and B. The intensity of the light which is transmitted through the liquid crystal elements is modulated by an image signal. Therefore, a viewer can capture an image by reflection light of the external light 139.

In addition, the display panel 120 includes photo sensors and has a touch-input function. When the color filter also overlaps with a light-receiving region of photo sensors, the photo sensors can also function as a visible light sensor. Further, in order to improve the optical sensitivity of the photo sensor, a large amount of incident light is taken in. Therefore, an opening may be provided in the color filter in a region overlapping with the light-receiving region of photo sensors so that the light-receiving region of photo sensors and the color filter do not overlap with each other.

Note that this embodiment can be combined with any of the other embodiments described in this specification as appropriate.

Embodiment 6

In this embodiment, an example of a transistor including an oxide semiconductor layer, which is used for the liquid crystal display devices described in Embodiments 1 to 3, and an example of a manufacturing method of the transistor will be described in detail with reference to FIGS. 18A to 18E. The same portion as or a portion having a function similar to that in the above embodiments can be formed in a manner similar to that described in the above embodiments, and also the steps similar to those in the above embodiments can be performed in a manner similar to that described in the above embodiments, and repetitive description is omitted. In addition, detailed description of the same portions is not repeated.

FIGS. 18A to 18E illustrate an example of a cross-sectional structure of a transistor. A transistor 510 illustrated in FIGS. 18A to 18E is an inverted staggered transistor with a bottom gate structure which is similar to that of the transistor 350 illustrated in FIG. 1A.

A process for manufacturing the transistor 510 over a substrate 505 will be described below with reference to FIGS. 18A to 18E.

First, a conductive film is formed over the substrate 505 having an insulating surface, and then, a gate electrode layer 511 is formed through a first photolithography process. Note that a resist mask may be formed by an inkjet method. Formation of the resist mask by an inkjet method needs no photomask; thus, manufacturing cost can be reduced.

In this embodiment, a glass substrate is used as the substrate 505 having an insulating surface.

An insulating film serving as a base film may be provided between the substrate 505 and the gate electrode layer 511. The base film has a function of preventing diffusion of an impurity element from the substrate 505. The base film can be formed with a single-layer structure or a layered structure including one or more of a silicon nitride film, a silicon oxide film, a silicon nitride oxide film, and a silicon oxynitride film.

The gate electrode layer 511 can be formed with a single-layer structure or a layered structure including a metal material such as molybdenum, titanium, tantalum, tungsten, aluminum, copper, neodymium, or scandium, or an alloy material which contains any of these metal materials as its main component.

Next, a gate insulating layer 507 is formed over the gate electrode layer 511. The gate insulating layer 507 can be formed with a single-layer or a stacked-layer structure including a silicon oxide layer, a silicon nitride layer, a silicon oxynitride layer, a silicon nitride oxide layer, an aluminum oxide layer, an aluminum nitride layer, an aluminum oxynitride layer, an aluminum nitride oxide layer, or a hafnium oxide layer by a plasma CVD method, a sputtering method, or the like.

For the oxide semiconductor in this embodiment, an oxide semiconductor which is made to be an i-type semiconductor or a substantially i-type semiconductor by removing an impurity is used. Such a highly-purified oxide semiconductor is highly sensitive to an interface state and interface charge; thus, an interface between the oxide semiconductor layer and the gate insulating layer is important. For that reason, the gate insulating layer that is in contact with a highly-purified oxide semiconductor needs to have high quality.

For example, high-density plasma CVD using microwaves (e.g., with a frequency of 2.45 GHz) is preferably adopted because an insulating layer can be dense and have high withstand voltage and high quality. The highly-purified oxide semiconductor and the high-quality gate insulating layer are in close contact with each other, whereby the interface state can be reduced to obtain favorable interface characteristics.

Needless to say, another film formation method such as a sputtering method or a plasma CVD method can be employed as long as the method enables formation of a good-quality insulating layer as a gate insulating layer. Further, the film quality of the gate insulating layer and characteristics of the interface between the gate insulating layer and an oxide semiconductor may be improved by heat treatment which is performed after formation of the gate insulating layer. In any case, any insulating layer may be used as long as the insulating layer has characteristics of enabling reduction in interface state density of the interface between the insulating layer and an oxide semiconductor and formation of a favorable interface as well as having favorable film quality as a gate insulating layer.

In order that hydrogen, a hydroxyl group, and moisture are contained as little as possible in the gate insulating layer 507 and the oxide semiconductor film 530, it is preferable that as pretreatment of the oxide semiconductor film 530, the substrate 505 over which the gate electrode layer 511 is formed, or the substrate 505 over which layers up to the gate insulating layer 507 are formed be heated in a preheating chamber of a sputtering apparatus so that impurities such as hydrogen and moisture adsorbed to the substrate 505 are eliminated and evacuated. As an exhaustion unit provided in the preheating chamber, a cryopump is preferable. Note that this preheating treatment can be omitted. Alternatively, before the formation of the insulating layer 516, this preheating may be similarly performed on the substrate 505 over which layers up to the source electrode layer 515a and the drain electrode layer 515b are formed.

Figure 18A:
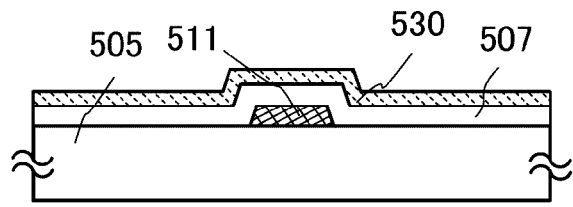
FIGS. 18A to 18E are cross-sectional views illustrating an example of a transistor including an oxide semiconductor layer and a manufacturing method thereof.
Figure 18B:
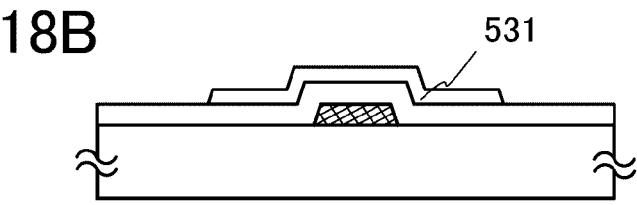

Next, over the gate insulating layer 507, the oxide semiconductor film 530 having a thickness of greater than or equal to 2 nm and less than or equal to 200 nm, preferably greater than or equal to 5 nm and less than or equal to 30 nm is formed (see FIG. 18A).

Note that before the oxide semiconductor film 530 is formed by a sputtering method, powdery substances (also referred to as particles or dust) attached on a surface of the gate insulating layer 507 are preferably removed by reverse sputtering in which an argon gas is introduced and plasma is generated. The reverse sputtering refers to a method in which, without application of a voltage to a target side, an RF power source is used for application of a voltage to a substrate side under an argon atmosphere so that plasma is generated over the substrate to modify a surface. Note that instead of an argon atmosphere, a nitrogen atmosphere, a helium atmosphere, an oxygen atmosphere, or the like may be used.

As an oxide semiconductor used for the oxide semiconductor film 530, the following metal oxide can be used: a four-component metal oxide such as an In—Sn—Ga—Zn—O based oxide semiconductor; a three-component metal oxide such as an In—Ga—Zn—O based oxide semiconductor, an In—Sn—Zn—O based oxide semiconductor, an In—Al—Zn—O based oxide semiconductor, a Sn—Ga—Zn—O based oxide semiconductor, an Al—Ga—Zn—O based oxide semiconductor, a Sn—Al—Zn—O based oxide semiconductor; a two-component metal oxide such as an In—Zn—O based oxide semiconductor, a Sn—Zn—O based oxide semiconductor, an Al—Zn—O based oxide semiconductor, a Zn—Mg—O based oxide semiconductor, a Sn—Mg—O based oxide semiconductor, an In—Mg—O based oxide semiconductor, an In—Ga—O based oxide semiconductor; an In—O based oxide semiconductor, a Sn—O based oxide semiconductor, a Zn—O based oxide semiconductor, or the like. Further. $SiO_2$ may be contained in the above oxide semiconductor. Note that here, for example, an In—Ga—Zn—O based oxide semiconductor means an oxide film including indium (In), gallium (Ga), and zinc (Zn) and there is no particular limitation on the stoichiometric proportion. The In—Ga—Zn—O based oxide semiconductor layer may contain an element other than In, Ga, and Zn. In this embodiment, the oxide semiconductor film 530 is formed by a sputtering method with use of an In—Ga—Zn—O based oxide target. A cross-sectional view of this step corresponds to FIG. 18A. Alternatively, the oxide semiconductor film 530 can be formed by a sputtering method under a rare gas (typically argon) atmosphere, an oxygen atmosphere, or a mixed atmosphere containing a rare gas and oxygen.

As the target for forming the oxide semiconductor film 530 by a sputtering method, for example, an oxide target having a composition ratio of $In_2O_3:Ga_2O_3:ZnO=1:1:1$ [molar ratio] is used to form an In—Ga—Zn—O film. Without limitation on the material and the component of the target, for example, an oxide target having a composition ratio of $In_2O_3:Ga_2O_3:ZnO=1:1:2$ [molar ratio] may be used.

The filling rate of the oxide target is higher than or equal to 90% and lower than or equal to 100%, preferably higher than or equal to 95% and lower than or equal to 99.9%. With use of the metal oxide target with high filling rate, a dense oxide semiconductor film can be formed.

It is preferable that a high-purity gas from which impurities such as hydrogen, water, a hydroxyl group, or hydride have been removed be used as a sputtering gas for forming the oxide semiconductor film 530.

The substrate is placed in a deposition chamber under reduced pressure, and the substrate temperature is set to higher than or equal to 100° C. and lower than or equal to 600° C., preferably higher than or equal to 200° C. and lower than or equal to 400° C. Deposition is performed while the substrate is heated, whereby the concentration of an impurity contained in the oxide semiconductor film formed can be reduced. In addition, damage by sputtering can be reduced. Then, residual moisture in the deposition chamber is removed, a sputtering gas from which hydrogen and moisture are removed is introduced, and the above-described target is used, so that the oxide semiconductor film 530 is formed over the substrate 505. In order to remove the residual moisture in the deposition chamber, an entrapment vacuum pump, for example, a cryopump, an ion pump, or a titanium sublimation pump is preferably used. The evacuation unit may be a turbo pump provided with a cold trap. In the deposition chamber which is evacuated with the cryopump, for example, a hydrogen atom, a compound containing a hydrogen atom, such as water ($H_2O$), (further preferably, also a compound containing a carbon atom), and the like are removed, whereby the concentration of an impurity in the oxide semiconductor film formed in the deposition chamber can be reduced.

As an example of the deposition condition, the distance between the substrate and the target is 100 mm, the pressure is 0.6 Pa, the direct-current (DC) power source is 0.5 kW, and the atmosphere is an oxygen atmosphere (the proportion of the oxygen flow rate is 100%). Note that a pulse direct current power source is preferable because powdery substances (also referred to as particles or dust) generated in deposition can be reduced and the film thickness can be uniform.

Next, the oxide semiconductor film 530 is processed into an island-shaped oxide semiconductor layer through a second photolithography process. A resist mask for forming the island-shaped oxide semiconductor layer may be formed by an inkjet method. Formation of the resist mask by an inkjet method needs no photomask; thus, manufacturing cost can be reduced.

In the case where a contact hole is formed in the gate insulating layer 507, a step of forming the contact hole can be performed at the same time as processing of the oxide semiconductor film 530.

For the etching of the oxide semiconductor film 530, either one or both of wet etching and dry etching may be employed. As an etchant used for wet etching of the oxide semiconductor film 530, for example, a mixed solution of phosphoric acid, acetic acid, and nitric acid such as ITO07N (produced by Kanto Chemical Co., Inc.), or the like can be used.

Next, first heat treatment is performed on the oxide semiconductor layer. The oxide semiconductor layer can be dehydrated or dehydrogenated by this first heat treatment. The temperature of the first heat treatment is higher than or equal to 400° C. and lower than or equal to 750° C., or higher than or equal to 400° C. and lower than the strain point of the substrate. Here, the substrate is put in an electric furnace which is a kind of heat treatment apparatus and heat treatment is performed on the oxide semiconductor layer at 450° C. for one hour under a nitrogen atmosphere, and then, water or hydrogen is prevented from entering the oxide semiconductor layer without exposure to the air; thus, an oxide semiconductor layer 531 is obtained (see FIG. 18B).

Note that a heat treatment apparatus is not limited to an electric furnace, and may include a device for heating an object to be processed by heat conduction or heat radiation from a heating element such as a resistance heating element. For example, a rapid thermal annealing (RTA) apparatus such as a gas rapid thermal annealing (GRTA) apparatus or a lamp rapid thermal annealing (LRTA) apparatus can be used. An LRTA apparatus is an apparatus for heating an object to be processed by radiation of light (an electromagnetic wave) emitted from a lamp such as a halogen lamp, a metal halide lamp, a xenon arc lamp, a carbon arc lamp, a high pressure sodium lamp, or a high pressure mercury lamp. A GRTA apparatus is an apparatus for heat treatment using a high-temperature gas. As the high temperature gas, an inert gas which does not react with an object to be processed by heat treatment, such as nitrogen or a rare gas like argon, is used.

For example, as the first heat treatment, GRTA in which the substrate is moved into an inert gas heated to a high temperature as high as 650° C. to 700° C., heated for several minutes, and moved out of the inert gas heated to the high temperature may be performed.

Note that in the first heat treatment, it is preferable that water, hydrogen, and the like be not contained in the atmosphere of nitrogen or a rare gas such as helium, neon, or argon. It is preferable that the purity of nitrogen or the rare gas such as helium, neon, or argon which is introduced into a heat treatment apparatus be set to 6N (99.9999%) or higher, preferably 7N (99.99999%) or higher (that is, the concentration of an impurity is 1 ppm or lower, preferably 0.1 ppm or lower).

Further, after the oxide semiconductor layer is heated in the first heat treatment, a high-purity oxygen gas, a high-purity $N_2O$ gas, or an ultra-dry air (the dew point is lower than or equal to −40° C., preferably lower than or equal to −60° C.) may be introduced into the same furnace. It is preferable that water, hydrogen, and the like be not contained in an oxygen gas or an $N_2O$ gas. The purity of the oxygen gas or the $N_2O$ gas which is introduced into the heat treatment apparatus is preferably 6N or more, higher preferably 7N or higher (i.e., the concentration of an impurity in the oxygen gas or the $N_2O$ gas is preferably 1 ppm or lower, more preferably 0.1 ppm or lower). By the action of the oxygen gas or the $N_2O$ gas, oxygen which is a main component included in the oxide semiconductor and which has been reduced at the same time as the step for removing impurities by dehydration or dehydrogenation is supplied, so that the oxide semiconductor layer can be a highly-purified and electrically i-type (intrinsic) oxide semiconductor.

In addition, the first heat treatment of the oxide semiconductor layer can also be performed on the oxide semiconductor film 530 which has not yet been processed into the island-shaped oxide semiconductor layer. In that case, the substrate is taken out from the heat apparatus after the first heat treatment, and then a photolithography process is performed.

Note that the first heat treatment may be performed at any of the following timings instead of the above timing as long as after deposition of the oxide semiconductor layer: after a source electrode layer and a drain electrode layer are formed over the oxide semiconductor layer; and after an insulating layer is formed over the source electrode layer and the drain electrode layer.

Further, the step of forming the contact hole in the gate insulating layer 507 may be performed either before or after the first heat treatment is performed on the semiconductor film 530.

In addition, as the oxide semiconductor layer, an oxide semiconductor layer having a crystal region with a large thickness (a single crystal region), that is, a crystal region which is c-axis-aligned perpendicularly to a surface of the film may be formed by performing deposition twice and heat treatment twice, even when any of an oxide, a nitride, a metal, or the like is used for a material of a base component. For example, a first oxide semiconductor film with a thickness greater than or equal to 3 nm and less than or equal to 15 nm is deposited, and first heat treatment is performed under a nitrogen, an oxygen, a rare gas, or a dry air atmosphere at a temperature higher than or equal to 450° C. and lower than or equal to 850° C., preferably higher than or equal to 550° C. and lower than or equal to 750° C., so that a first oxide semiconductor film having a crystal region (including a plate-like crystal) in a region including a surface is formed. Then, a second oxide semiconductor film which has a larger thickness than the first oxide semiconductor film is formed, and second heat treatment is performed at a temperature higher than or equal to 450° C. and lower than or equal to 850° C., preferably higher than or equal to 600° C. and lower than or equal to 700° C., so that crystal growth proceeds upward with use of the first oxide semiconductor film as a seed of the crystal growth and the whole second oxide semiconductor film is crystallized. In such a manner, the oxide semiconductor layer having a crystal region with a large thickness may be formed.

Next, a conductive film serving as the source electrode layer and the drain electrode layer (including a wiring formed in the same layer as the source electrode layer and the drain electrode layer) is formed over the gate insulating layer 507 and the oxide semiconductor layer 531. As the conductive film serving as the source electrode layer and the drain electrode layer, for example, a metal film including an element selected from Al, Cr, Cu, Ta, Ti, Mo, and W or a metal nitride film including any of the above elements as its component (e.g., a titanium nitride film, a molybdenum nitride film, or a tungsten nitride film) can be used. Alternatively, a film of a high-melting-point metal such as Ti, Mo, or W or a metal nitride film (e.g., a titanium nitride film, a molybdenum nitride film, or a tungsten nitride film) may be formed over or/and below the metal film such as an Al film or a Cu film.

Figure 18C:
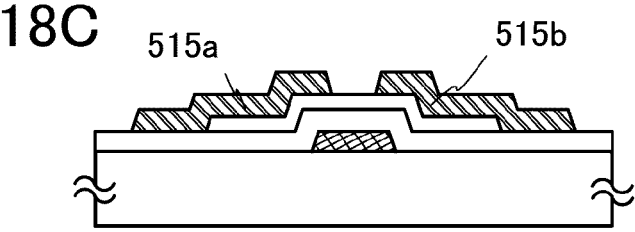

A resist mask is formed over the conductive film through a third photolithography process, and the source electrode layer 515a and the drain electrode layer 515b are formed by selective etching, and then, the resist mask is removed (see FIG. 18C).

It is preferable to use ultraviolet light, KrF laser light, or ArF laser light when light exposure is performed at the time of the formation of the resist mask in the third photolithography process. A channel length L of a transistor that is completed later is determined by a distance between bottom end portions of the source electrode layer and the drain electrode layer, which are adjacent to each other over the oxide semiconductor layer 531. In the case where light exposure is performed for a channel length L of less than 25 nm, it is preferable to use extreme ultraviolet having an extremely short wavelength of several nanometers to several tens of nanometers when the light exposure is performed at the time of the formation of the resist mask in the third photolithography process. Light exposure with extreme ultraviolet leads to a high resolution and a large depth of focus. Thus, the channel length L of the transistor that is completed later can be greater than or equal to 10 nm and less than or equal to 1000 nm and the operation speed of a circuit can be increased.

In order to reduce the number of photomasks used in a photolithography process and reduce the number of photolithography processes, an etching step may be performed with use of a multi-tone mask which is a light-exposure mask through which light is transmitted to have various intensities. A resist mask formed with use of a multi-tone mask has various thicknesses and further can be changed in shape by etching; therefore, the resist mask can be used in a plurality of etching steps for processing into different patterns. Accordingly, a resist mask corresponding to at least two kinds of different patterns can be formed by one multi-tone mask. Thus, the number of light-exposure masks can be reduced and the number of corresponding photolithography processes can be also reduced, whereby simplification of the process can be realized.

Note that it is preferable that etching conditions be optimized so as not to etch and divide the oxide semiconductor layer 531 when the conductive film is etched. However, it is difficult to obtain etching conditions in which only the conductive film is etched and the oxide semiconductor layer 531 is not etched at all. In some cases, only part of the oxide semiconductor layer 531 is etched when the conductive film is etched, whereby the oxide semiconductor layer 531 having a groove portion (a depressed portion) is formed.

In this embodiment, since the Ti film is used as the conductive film and the In—Ga—Zn—O based oxide semiconductor is used as the oxide semiconductor layer 531, ammonia hydrogen peroxide mixture (a mixed solution of ammonia, water, and hydrogen peroxide) is used as an etchant for etching the conductive film.

Next, by plasma treatment using a gas such as $N_2O$, $N_2$, or Ar, water or the like adsorbed to an exposed surface of the oxide semiconductor layer may be removed. In the case where the plasma treatment is performed, the insulating layer 516 is formed without exposure to the air as a protective insulating film in contact with part of the oxide semiconductor layer.

The insulating layer 516 can be formed to a thickness of at least 1 nm by a method by which an impurity such as water or hydrogen does not enter the insulating layer 516, such as a sputtering method as appropriate. When hydrogen is contained in the insulating layer 516, entry of hydrogen to the oxide semiconductor layer, or extraction of oxygen in the oxide semiconductor layer by hydrogen may occur, thereby causing the backchannel of the oxide semiconductor layer to have lower resistance (to be n-type), so that a parasitic channel may be formed. Therefore, it is important that a deposition method in which hydrogen is not used is employed in order to form the insulating layer 516 containing hydrogen as little as possible.

In this embodiment, a 200-nm-thick silicon oxide film is formed as the insulating layer 516 by a sputtering method. The substrate temperature in deposition may be higher than or equal to room temperature and lower than or equal to 300° C. and in this embodiment, is 100° C. The silicon oxide film can be deposited by a sputtering method under a rare gas (typically, argon) atmosphere, an oxygen atmosphere, or a mixed atmosphere containing a rare gas and oxygen. As a target, a silicon oxide target or a silicon target can be used. For example, the silicon oxide film can be formed using a silicon target by a sputtering method under an atmosphere containing oxygen. As the insulating layer 516 which is formed in contact with the oxide semiconductor layer, an inorganic insulating film which does not include impurities such as moisture, a hydrogen ion, and OH⁻ and blocks entry of these impurities from the outside is used. Typically, a silicon oxide film, a silicon oxynitride film, an aluminum oxide film, an aluminum oxynitride film, or the like is used.

In order to remove residual moisture in the deposition chamber of the insulating layer 516 as in the case of the deposition of the oxide semiconductor film 530, an entrapment vacuum pump (such as a cryopump) is preferably used. When the insulating layer 516 is deposited in the deposition chamber evacuated using a cryopump, the concentration of an impurity in the insulating layer 516 can be reduced. Alternatively, as an exhaustion unit for removing the residual moisture in the deposition chamber of the insulating layer 516, a turbo pump provided with a cold trap may be used.

It is preferable that a high-purity gas in which an impurity such as hydrogen, water, a hydroxyl group, or hydride is removed be used as the sputtering gas for the deposition of the insulating layer 516.

Next, second heat treatment is performed under an inert gas atmosphere or an oxygen gas atmosphere (preferably at a temperature higher than or equal to 200° C. and lower than or equal to 400° C., for example, higher than or equal to 250° C. and lower than or equal to 350° C.). For example, the second heat treatment is performed at 250° C. for one hour under a nitrogen atmosphere. In the second heat treatment, part of the oxide semiconductor layer (a channel formation region) is heated while being in contact with the insulating layer 516.

Through the above process, the first heat treatment is performed on the oxide semiconductor film so that an impurity such as hydrogen, moisture, a hydroxyl group, or hydride (also referred to as a hydrogen compound) is intentionally removed from the oxide semiconductor layer. Further, oxygen which is one of main components of an oxide semiconductor and is simultaneously reduced in a step of removing an impurity can be supplied. Accordingly, the oxide semiconductor layer is highly purified to be an electrically i-type (intrinsic) semiconductor.

Figure 18D:
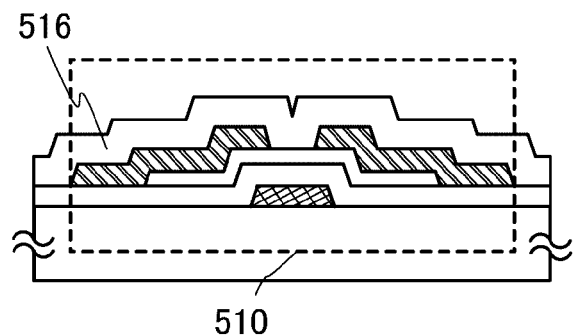
Figure 18E:
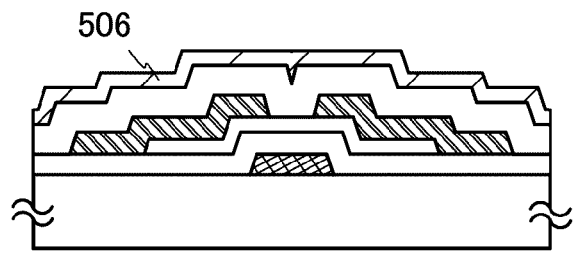

Through the above process, the transistor 510 is formed (see FIG. 18D).

When a silicon oxide layer having a lot of defects is used as the insulating layer 516, heat treatment after formation of the silicon oxide layer has an effect in diffusing an impurity such as hydrogen, moisture, a hydroxyl group, or hydride contained in the oxide semiconductor layer to the oxide insulating layer so that the impurity contained in the oxide semiconductor layer can be further reduced.

A protective insulating layer 506 may be formed over the insulating layer 516. As the protective insulating layer 506, for example, a silicon nitride film is formed by an RF sputtering method. Since an RF sputtering method has high productivity, it is preferably used as a deposition method of the protective insulating layer. As the protective insulating layer, an inorganic insulating film which does not include an impurity such as moisture and prevents entry of the impurity from the outside, such as a silicon nitride film or an aluminum nitride film is used. In this embodiment, as the protective insulating layer, the protective insulating layer 506 is formed using a silicon nitride film (see FIG. 18E).

In this embodiment, as the protective insulating layer 506, a silicon nitride film is formed by heating the substrate 505 over which layers up to the insulating layer 516 are formed, to a temperature of 100° C. to 400° C., introducing a sputtering gas containing high-purity nitrogen from which hydrogen and moisture are removed, and using a target of a silicon semiconductor. In that case, the protective insulating layer 506 is preferably deposited removing residual moisture in a treatment chamber, similarly to the insulating layer 516.

After the formation of the protective insulating layer, heat treatment may be further performed at a temperature higher than or equal to 100° C. and lower than or equal to 200° C. for longer than or equal to one hour and shorter than or equal to 30 hours under the air. This heat treatment may be performed at a fixed heating temperature. Alternatively, the following change in the heating temperature may be conducted plural times repeatedly: the heating temperature is increased from a room temperature to a temperature higher than or equal to 100° C. and lower than or equal to 200° C. and then decreased to a room temperature.

As described above, the transistor described in this embodiment has high field effect mobility, so that high-speed operation is possible. Accordingly, by using the transistor including the highly-purified oxide semiconductor layer in a pixel portion of a liquid crystal display device, color separation can be suppressed and a high-quality image can be provided. Since the transistors can be separately formed over one substrate in a driver circuit portion and a pixel portion, the number of components of the liquid crystal display device can be reduced.

The results obtained by measuring the field effect mobility of the transistor including a highly-purified oxide semiconductor will be described.

Figure 19:
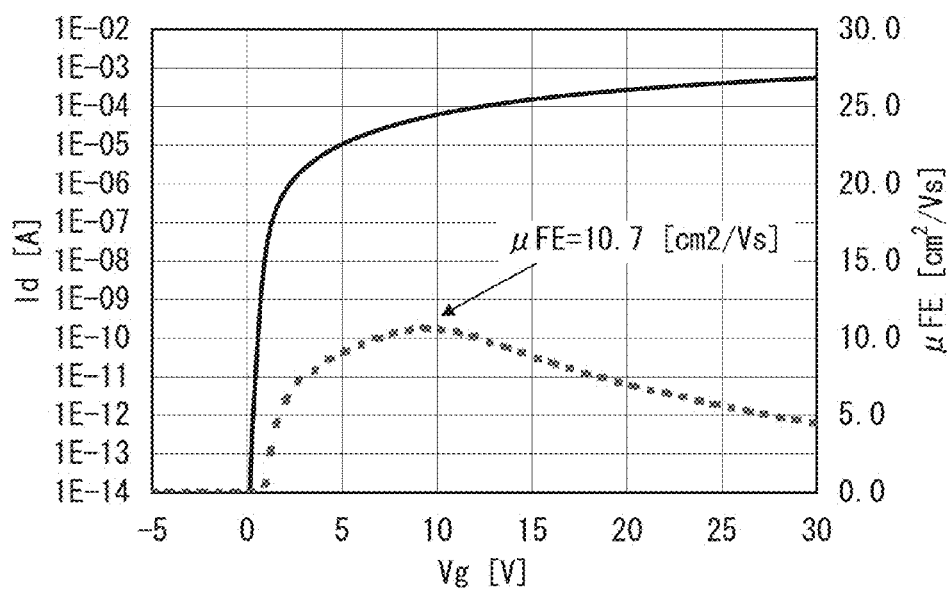
FIG. 19 is a graph showing Vg-Id characteristics of a transistor including an oxide semiconductor.

A transistor (L/W=10 μm/50 μm) including the highly-purified oxide semiconductor (a 50-nm-thick In—Ga—Zn—O based oxide semiconductor film) is manufactured according to the method of this embodiment. The change in characteristics of source-drain current (hereinafter referred to as drain current or Id), that is, Vg-Id characteristics were measured under the condition that the substrate temperature was room temperature, source-drain voltage (hereinafter referred to as drain voltage or Vd) was 10 V, and source-gate voltage (hereinafter referred to as gate voltage or Vg) was changed from −30 V to +30 V. Note that FIG. 19 shows Vg in the range of −5 V to +30 V. As seen from FIG. 19, the maximum value of the electrical field mobility μFE of a transistor including the highly-purified oxide semiconductor is 10.7 cm²/(V·s).

When the transistor including a highly-purified oxide semiconductor layer is used, the current value (an off-state current value) can be further reduced. Accordingly, an electrical signal such as an image signal can be held for a longer period, and a writing interval can be set longer. Therefore, the frequency of refresh operation can be reduced, which leads to a higher effect of suppressing power consumption.

The results obtained by measuring the off-state current of the transistor including a highly-purified oxide semiconductor will be described.

Figure 20:
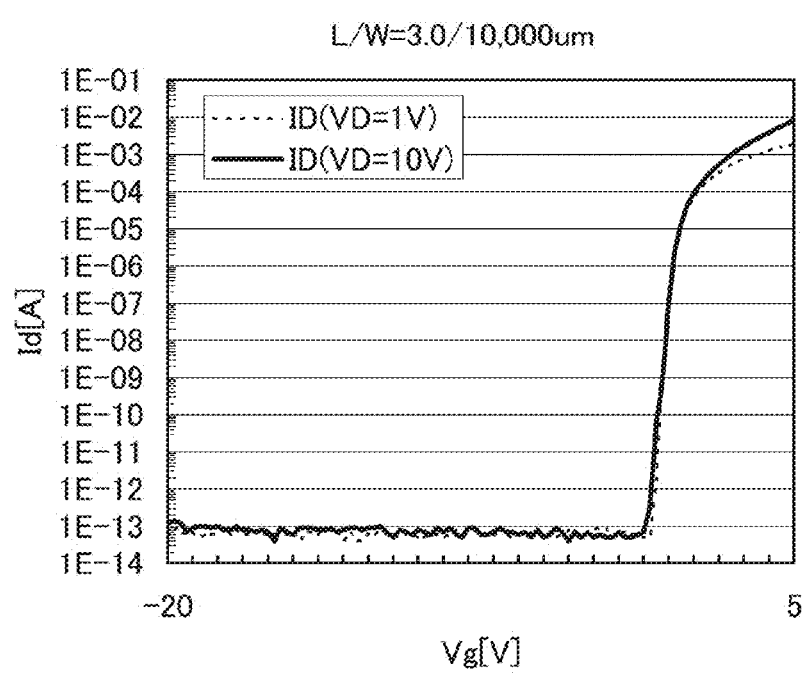
FIG. 20 is a graph showing off-state characteristics of Vg-Id characteristics of a transistor including an oxide semiconductor.

A transistor including the highly-purified oxide semiconductor was manufactured according to the method of this embodiment. First, a transistor with a channel width W of 1 m, which is sufficiently wide, was prepared in consideration of the very small off-state current of a transistor including a highly-purified oxide semiconductor, and the off-state current was measured. FIG. 20 shows the results obtained by measurement of the off-state current of the transistor with a channel width W of 1 m. In FIG. 20, the horizontal axis indicates a gate voltage Vg and the vertical axis indicates a drain current Id. In the case where the drain voltage VD is +1 V or +10 V and the gate voltage VG is within the range of −20 V to −5 V, the off-state current of the transistor was found to be less than or equal to $1\times10^{-13}$ A which is the detection limit. Moreover, the off-state current of the transistor (the value per unit channel width (1 µm) here) was found to be less than or equal to 1 aA/µm ($1\times10^{-18}$ A/µm).

Next, the results obtained by measuring the off-state current of the transistor including a highly-purified oxide semiconductor more accurately will be described. As described above, the off-state current of the transistor including a highly-purified oxide semiconductor was found to be less than or equal to $1\times10^{-13}$ A which is the detection limit of measurement equipment. Here, the results obtained by measuring more accurate off-state current (the value less than or equal to the detection limit of measurement equipment in the above measurement), with use of an element for characteristic evaluation, will be described.

An element for characteristic evaluation used for measuring the current will be described below.

In the element for characteristic evaluation, three measurement systems that are connected in parallel are used. Each measurement system includes a capacitor, a first transistor, a second transistor, a third transistor, and a fourth transistor. The first to fourth transistors were manufactured according to this embodiment, and the structures of these transistors were the same as the structure of the transistor 510 illustrated in FIG. 18D.

In one of the measurement systems, one of a source terminal and a drain terminal of the first transistor, one terminal of the capacitor, and one of a source terminal and a drain terminal of the second transistor are connected to a power source (a power source for supplying V2). The other of the source terminal and the drain terminal of the first transistor, one of a source terminal and a drain terminal of the third transistor, the other terminal of the capacitor, and a gate terminal of the second transistor are connected to one another. The other of the source terminal and the drain terminal of the third transistor, one of a source terminal and a drain terminal of the fourth transistor, and a gate terminal of the fourth transistor are connected to a power source (a power source for supplying V1). The other of the source terminal and the drain terminal of the second transistor, and the other of the source terminal and the drain terminal of the fourth transistor are connected to each other and serve as an output terminal Vout.

A potential Vext_b2 for controlling an on/off state of the first transistor is supplied to the gate terminal of the first transistor. A potential Vext_b1 for controlling an on/off state of the third transistor is supplied to the gate terminal of the third transistor. A potential Vout is output from the output terminal.

The off-state current was measured with use of the measurement systems.

When a potential difference is applied at an initial period in order to measure the off-state current and the measurement starts, the potential of the gate terminal of the second transistor varies as time passes. Accordingly, the output potential Vout of the output terminal also varies with the lapse of time. The off-state current can be calculated on the basis of the obtained output potential Vout.

Each of the first to fourth transistors is a transistor including a highly-purified oxide semiconductor with a channel length L of 10 µm and a channel width W of 50 µm. In the three measurement systems connected in parallel, the capacitance values of a capacitor of a first measurement system, a capacitor of a second measurement system, and a capacitor of a third measurement system were set to 100 fF, 1 pF, and 3 pF, respectively.

Note that VDD was set to 5 V and VSS was set to 0 V in the measurement of off-state current. In the measurement period, the potential V1 was basically set to VSS and set to VDD only in a period of 100 msec every 10 to 300 seconds, and Vout was measured. Further, Δt which was used in calculation of current I which flows through the element was about 30000 sec.

Figure 21:
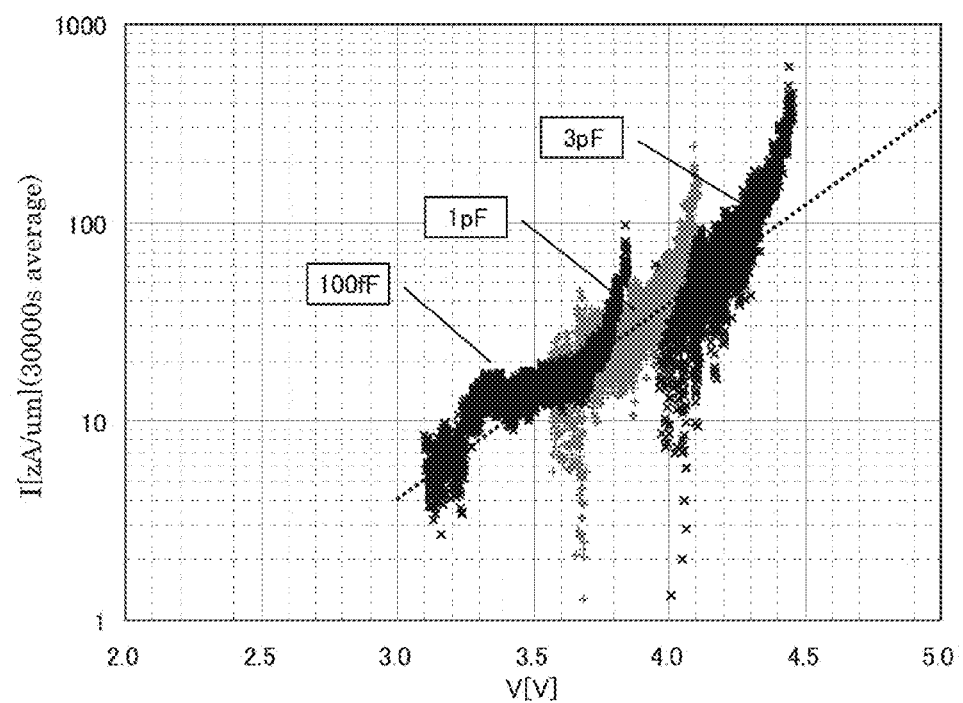
FIG. 21 is a graph showing a relationship between a source-drain voltage V and an off-state current I.

FIG. 21 shows the off-state current which is calculated in the above measurement of the current. In FIG. 21, the relationship between source-drain voltage V and off-state current I is shown. According to FIG. 21, an off-state current was about 40 zA/µm, where the source-drain voltage was 4 V. In addition, the off-state current was less than or equal to 10 zA/µm under the condition where the source-drain voltage was 3.1 V. Note that 1 zA represents $10^{-21}$ A.

According to this embodiment, it was confirmed that the off-state current is sufficiently small in a transistor including a highly-purified oxide semiconductor.

Embodiment 7

In this embodiment, examples of electronic devices including the liquid crystal display device described in any of Embodiments 1 to 6 will be described.

Figure 16A:
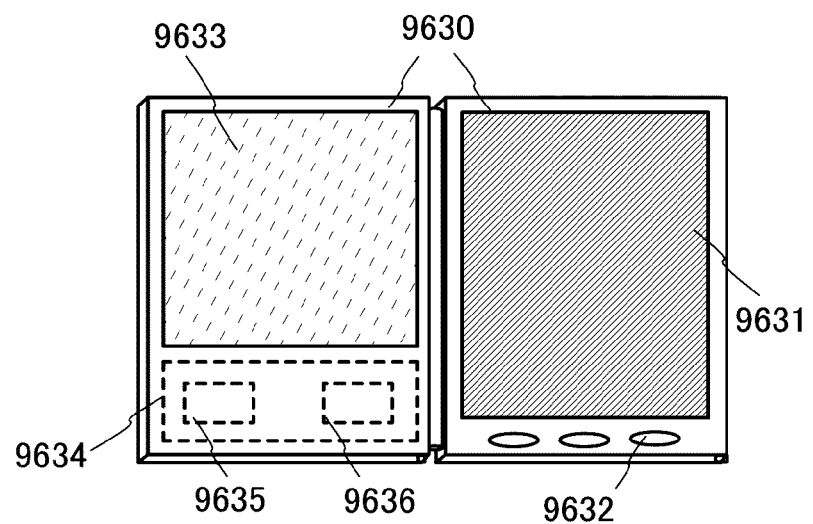
FIGS. 16A and 16B illustrate a liquid crystal display device according to an embodiment.

FIG. 16A illustrates an electronic book reader (also referred to as an e-book reader) which can include housings 9630, a display portion 9631, operation keys 9632, a solar cell 9633, and a charge and discharge control circuit 9634. The electronic book reader is provided with the solar cell 9633 and a display panel so that the solar cell 9633 and the display panel can be opened and closed freely. In the electronic book reader, power from the solar cell is supplied to the display panel or a video signal processing portion. The electronic book reader illustrated in FIG. 16A can have a function of displaying various kinds of data (e.g., a still image, a moving image, and a text image), a function of displaying a calendar, a date, the time, or the like on the display portion, a touch-input function of operating or editing the information displayed on the display portion by touch input, a function of controlling processing by various kinds of software (programs), and the like. Note that in FIG. 16A, a structure including a battery 9635 and a DCDC converter (hereinafter abbreviated as a converter 9636) is illustrated as an example of the charge and discharge control circuit 9634.

The display portion 9631 is a reflective liquid crystal display device having a touch-input function with use of photo sensors and is used in a comparatively bright environment. Therefore, the structure illustrated in FIG. 16A is preferable because power generation by the solar cell 9633 and charge in the battery 9635 can be performed effectively. Note that a structure in which the solar cell 9633 is provided on each of a surface and a rear surface of the housing 9630 is preferable in order to charge the battery 9635 efficiently. When a lithium ion battery is used as the battery 9635, there is an advantage of downsizing or the like.

Figure 16B:
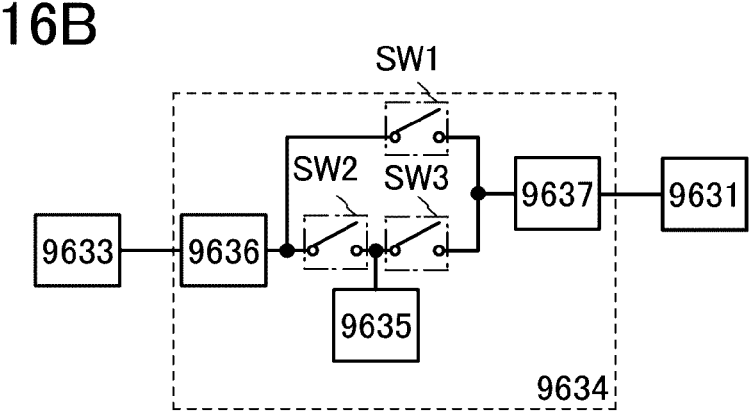

The structure and the operation of the charge and discharge control circuit 9634 illustrated in FIG. 16A are described with reference to a block diagram in FIG. 16B. The solar cell 9633, the battery 9635, the converter 9636, the converter 9637, switches SW1 to SW3, and the display portion 9631 are shown in FIG. 16B, and the battery 9635, the converter 9636, the converter 9637, and the switches SW1 to SW3 correspond to the charge and discharge control circuit 9634.

First, an example of operation in the case where power is generated by the solar cell 9633 using external light will be described. The voltage of power generated by the solar cell is raised or lowered by the converter 9636 so that the power has a voltage for charging the battery 9635. Then, when the power from the solar cell 9633 is used for the operation of the display portion 9631, the switch SW1 is turned on and the voltage of the power is raised or lowered by the converter 9637 so as to be a voltage needed for the display portion 9631. In addition, when display on the display portion 9631 is not performed, the switch SW1 is turned off and a switch SW2 is turned on so that charge of the battery 9635 may be performed.

Note that although the solar cell 9633 is described as an example of a means for charge, charge of the battery 9635 may be performed with another means. Further, a combination of the solar cell 9633 and another means for charge may be employed.

This embodiment can be implemented in appropriate combination with any of the structures described in the other embodiments.

This application is based on Japanese Patent Application serial no. 2010-024643 filed with Japan Patent Office on Feb. 5, 2010, the entire contents of which are hereby incorporated by reference.

EXPLANATION OF REFERENCE

100: display panel, 101: pixel circuit, 103: pixel, 104: pixel, 105: display element, 106: photo sensor, 107: display element driver circuit, 108: display element driver circuit, 109: circuit, 110: photo sensor driver circuit, 115: color filter, 116a: FPC (flexible printed circuit), 120: display panel, 125: display element, 135: light, 139: external light, 190: liquid crystal display module, 201: transistor, 202: storage capacitor, 203: liquid crystal element, 204: photodiode, 205: transistor, 206: transistor, 207: gate signal line, 208: photodiode reset signal line, 209: signal line, 210: video data signal line, 211: photo sensor output signal line, 212: photo sensor reference signal line, 213: gate signal line, 214: capacitor wiring, 221: transistor, 222: storage capacitor, 223: liquid crystal element, 224: capacitor wiring, 227: gate signal line, 230: substrate, 231: insulating layer, 232: gate insulating layer, 233: oxide semiconductor layer, 234: electrode layer, 235: electrode layer, 237: insulating layer, 238: p-layer, 239: i-layer, 240: n-layer, 241: insulating layer, 242: reflective electrode layer, 243: connection electrode layer, 244: alignment film, 245: depressed portion, 251: electrode layer, 252: electrode layer, 253: oxide semiconductor layer, 254: electrode layer, 255: oxide semiconductor layer, 256: oxide semiconductor layer, 257: electrode layer, 258: electrode layer, 259: electrode layer, 300: substrate, 307: insulating layer, 308: insulating layer, 340: resist mask, 340a: resist mask, 340b: resist mask, 350: transistor, 350B: transistor, 350G: transistor, 350R: transistor, 370: insulating layer, 403: counter electrode, 404: alignment film, 405: liquid crystal layer, 408: counter substrate, 411: pixel electrode, 411a: pixel electrode, 411b: pixel electrode, 412: pixel electrode, 413: pixel electrode, 421: insulating layer, 422: insulating layer, 431: insulating layer, 441: spacer, 450: liquid crystal display device, 451: pixel, 452: pixel, 453: pixel, 460: liquid crystal display device, 461: pixel, 462: pixel, 470: liquid crystal display device, 471: pixel, 472: pixel, 480: liquid crystal display device, 490: liquid crystal display device, 505: substrate, 506: protective insulating layer, 507: gate insulating layer, 510: transistor, 511: gate electrode layer, 512: gate signal line 515a: source electrode layer, 515b: drain electrode layer, 516: insulating layer, 530: oxide semiconductor film, 531: oxide semiconductor layer, 1032: display portion, 9630: housing, 9631: display portion, 9632: operation key, 9633: solar cell, 9634: charge/discharge control circuit, 9635: battery, 9636: converter, 9637: converter

What is claimed is:

1. A liquid crystal display device comprising:
a first insulating layer;
a first pixel electrode on the first insulating layer;
a second pixel electrode on the first insulating layer; and
a second insulating layer between the first pixel electrode and the second pixel electrode,
wherein a first end portion of the second insulating layer overlies a first end portion of the first pixel electrode,
wherein a second end portion of the second insulating layer is on the first insulating layer and underlies a first end portion of the second pixel electrode,
wherein the first pixel electrode and the second pixel electrode are reflective electrodes, and
wherein the first end portion of the second insulating layer is tapered.

2. A liquid crystal display device comprising:
a first insulating layer;
a first pixel electrode on the first insulating layer;
a second pixel electrode on the first insulating layer; and
a second insulating layer between the first pixel electrode and the second pixel electrode,
wherein a first end portion of the second insulating layer overlies a first end portion of the first pixel electrode,
wherein a second end portion of the second insulating layer is on the first insulating layer and underlies a first end portion of the second pixel electrode,
wherein the first end portion of the second pixel electrode overlaps the first end portion of the first pixel electrode with the second insulating layer therebetween,
wherein the first pixel electrode and the second pixel electrode are reflective electrodes, and
wherein the first end portion of the second insulating layer is tapered.

3. A liquid crystal display device comprising:
a substrate;
a first transistor over the substrate;
a second transistor over the substrate;
a first insulating layer over the first transistor and the second transistor;
a first pixel electrode which is on the first insulating layer and is electrically connected to the first transistor;
a second pixel electrode which is on the first insulating layer and is electrically connected to the second transistor; and
a second insulating layer between the first pixel electrode and the second pixel electrode,
wherein a first end portion of the second insulating layer overlies a first end portion of the first pixel electrode,
wherein a second end portion of the second insulating layer is on the first insulating layer and underlies a first end portion of the second pixel electrode,
wherein the first pixel electrode and the second pixel electrode are reflective electrodes, and
wherein the first end portion of the second insulating layer is tapered.

4. The liquid crystal display device according to claim 1, wherein the first pixel electrode or the second pixel electrode comprises an alloy comprising Ag, Pd, and Cu.

5. The liquid crystal display device according to claim 1, further comprising a liquid crystal layer over the first pixel electrode and the second pixel electrode, and a counter electrode over the liquid crystal layer.

6. The liquid crystal display device according to claim 1, further comprising a third insulating layer on the first insulating layer,
wherein a first end portion of the third insulating layer underlies a second end portion of the second pixel electrode, and
wherein a second end portion of the third insulating layer overlies a first end portion of a third pixel electrode on the first insulating layer.

7. The liquid crystal display device according to claim 2, wherein the first pixel electrode or the second pixel electrode comprises an alloy comprising Ag, Pd, and Cu.

8. The liquid crystal display device according to claim 2, further comprising a liquid crystal layer over the first pixel electrode and the second pixel electrode, and a counter electrode over the liquid crystal layer.

9. The liquid crystal display device according to claim 2, further comprising a third insulating layer on the first insulating layer,
wherein a first end portion of the third insulating layer underlies a second end portion of the second pixel electrode, and
wherein a second end portion of the third insulating layer overlies a first end portion of a third pixel electrode on the first insulating layer.

10. The liquid crystal display device according to claim 3, wherein the first pixel electrode or the second pixel electrode comprises an alloy comprising Ag, Pd, and Cu.

11. The liquid crystal display device according to claim 3, further comprising a liquid crystal layer over the first pixel electrode and the second pixel electrode, and a counter electrode over the liquid crystal layer.

12. The liquid crystal display device according to claim 3, further comprising a third insulating layer on the first insulating layer,
wherein a first end portion of the third insulating layer underlies a second end portion of the second pixel electrode, and
wherein a second end portion of the third insulating layer overlies a first end portion of a third pixel electrode which is on the first insulating layer and is electrically connected to a third transistor.

13. The liquid crystal display device according to claim 3, wherein the first transistor or the second transistor includes a channel comprising an oxide semiconductor.

14. The liquid crystal display device according to claim 3, wherein an off-state current of the first transistor or the second transistor is less than or equal to $1\times10^{18}$ A/$\mu$m.

* * * * *

UNITED STATES PATENT AND TRADEMARK OFFICE
CERTIFICATE OF CORRECTION

PATENT NO. : 9,541,803 B2
APPLICATION NO. : 14/729097
DATED : January 10, 2017
INVENTOR(S) : Shunpei Yamazaki It is certified that error appears in the above-identified patent and that said Letters Patent is hereby corrected as shown below:

In the Specification

Column 10, Line 5, "350G and 350B" should read --350G, and 350B--

Column 10, Line 31, "350G and 350B" should read --350G, and 350B--

Column 22, Line 46, "Further." should read --Further,--

Column 25, Line 42, "Mo, and W or a" should read --Mo, and W, or a--

In the Claims

Column 34, Line 26, Claim 14, "$1 \times 10^{18}$ A/μm" should read --$1 \times 10^{-18}$ A/μm--

Signed and Sealed this
Ninth Day of May, 2017

Michelle K. Lee
*Director of the United States Patent and Trademark Office*